(12) United States Patent
Pederson

(10) Patent No.: US 8,751,390 B2
(45) Date of Patent: *Jun. 10, 2014

(54) METHOD OF PROVIDING LUMENS AND TRACKING OF LUMEN CONSUMPTION

(71) Applicant: Federal Law Enforcement Development Services, Inc., St. Cloud, MA (US)

(72) Inventor: John C. Pederson, St. Cloud, MN (US)

(73) Assignee: Federal Law Enforcement Development Services, Inc., St. Cloud, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/972,294

(22) Filed: Aug. 21, 2013

(65) Prior Publication Data

US 2013/0339230 A1 Dec. 19, 2013

Related U.S. Application Data

(63) Continuation of application No. 13/350,463, filed on Jan. 13, 2012, now Pat. No. 8,543,505.

(60) Provisional application No. 61/432,949, filed on Jan. 14, 2011.

(51) Int. Cl.
*G06Q 40/00* (2012.01)
(52) U.S. Cl.
USPC .......................................................... 705/40
(58) Field of Classification Search
CPC .......................... G06Q 20/102; F21Y 2101/02; F21Y 2105/008
USPC .................................... 705/40; 362/23.07, 612
See application file for complete search history.

(56) References Cited

U.S. PATENT DOCUMENTS

| 700,678 A | 5/1902 | Downie |
| 2,082,279 A | 6/1937 | Fore |

(Continued)

FOREIGN PATENT DOCUMENTS

| AU | 2006201345 | 3/2006 | ............ G06Q 90/00 |
| AU | 2007202909 | 6/2007 | ............ G06F 17/30 |

(Continued)

OTHER PUBLICATIONS

OIDA: Light Emitting Diodes (LEDs) for General Illumination, Mar. 2001, an OIDA (Optoelectronics Industry Development Association) Report, pp. 1-72.*

(Continued)

*Primary Examiner* — Bijendra K Shrestha
(74) *Attorney, Agent, or Firm* — Vidas, Arrett & Steinkraus, P.A.

(57) ABSTRACT

Techniques are disclosed for compensating an LED light fixture/light source provider for generation of photons by one or more LED light fixtures used by a customer. In one example, a method comprises receiving a monetary amount as compensation for photons generated by the LED light fixtures/light sources, maintaining a contractual relationship with the customer in exchange for the monetary amount, the contractual relationship including a requirement that the provider pay an electricity supplier for the electricity consumed by the LED light fixtures/light sources, determining, with a meter associated with each respective LED light fixture/light source, the amount of electricity consumed by the LED light fixtures/light sources used by the customer over a period of time, and in response to the determination and on behalf of the customer, submitting payment to the customer's electricity supplier for the electricity consumed by the LED light fixtures/light sources used by the customer.

17 Claims, 6 Drawing Sheets

(56) References Cited

U.S. PATENT DOCUMENTS

| | | |
|---|---|---|
| 3,469,686 A | 9/1969 | Gutsche |
| 3,701,043 A | 10/1972 | Zuleeg |
| 3,705,316 A | 12/1972 | Burrous |
| 3,863,075 A | 1/1975 | Ironmonger |
| 3,867,718 A | 2/1975 | Moe |
| 3,889,147 A | 6/1975 | Groves |
| 3,911,430 A | 10/1975 | Jankowski |
| 4,149,111 A | 4/1979 | Coates, Jr. |
| 4,243,985 A | 1/1981 | Quayle |
| 4,254,453 A | 3/1981 | Mouyard |
| 4,271,408 A | 6/1981 | Teshima |
| 4,298,806 A | 11/1981 | Herold |
| 4,301,461 A | 11/1981 | Asano |
| 4,319,306 A | 3/1982 | Stanuch |
| 4,336,580 A | 6/1982 | Mouyard |
| 4,342,944 A | 8/1982 | SpringThorpe |
| 4,368,979 A | 1/1983 | Ruell |
| 4,390,931 A | 6/1983 | Gorick |
| 4,434,510 A | 2/1984 | Lemelson |
| 4,445,132 A | 4/1984 | Ichikawa |
| 4,556,862 A | 12/1985 | Meinershagen |
| 4,595,904 A | 6/1986 | Gosswiller |
| 4,598,198 A | 7/1986 | Fayfield |
| 4,614,866 A | 9/1986 | Liss |
| 4,615,131 A | 10/1986 | Wakatake |
| 4,616,225 A | 10/1986 | Woudenberg |
| 4,630,180 A | 12/1986 | Muraki |
| 4,630,183 A | 12/1986 | Fujita |
| 4,633,280 A | 12/1986 | Takasu |
| 4,654,629 A | 3/1987 | Bezos |
| 4,703,219 A | 10/1987 | Mesquida |
| 4,710,977 A | 12/1987 | Lemelson |
| 4,716,296 A | 12/1987 | Bussiere |
| 4,720,835 A | 1/1988 | Akiba |
| 4,724,312 A | 2/1988 | Snaper |
| 4,742,432 A | 5/1988 | Thillays |
| 4,799,135 A | 1/1989 | Inukai |
| 4,821,118 A | 4/1989 | Lafreniere |
| 4,821,338 A | 4/1989 | Naruse |
| 4,868,719 A | 9/1989 | Kouchi |
| 4,900,970 A | 2/1990 | Ando |
| 4,918,497 A | 4/1990 | Edmond |
| 4,928,084 A | 5/1990 | Reiser |
| 4,929,866 A | 5/1990 | Murata |
| 4,935,665 A | 6/1990 | Murata |
| 4,949,866 A | 8/1990 | Sanders |
| 4,954,822 A | 9/1990 | Borenstein |
| 4,965,644 A | 10/1990 | Kawabata |
| 4,966,862 A | 10/1990 | Edmond |
| 4,975,644 A | 12/1990 | Fox |
| 4,975,814 A | 12/1990 | Schairer |
| 4,990,970 A | 2/1991 | Fuller |
| 5,000,569 A | 3/1991 | Nylund |
| 5,027,168 A | 6/1991 | Edmond |
| 5,035,055 A | 7/1991 | McCullough |
| 5,038,406 A | 8/1991 | Titterton |
| 5,041,947 A | 8/1991 | Yuen |
| 5,045,767 A | 9/1991 | Wakatake |
| 5,050,055 A | 9/1991 | Lindsay |
| 5,057,828 A | 10/1991 | Rousseau |
| 5,060,303 A | 10/1991 | Wilmoth |
| 5,067,788 A | 11/1991 | Jannson |
| 5,091,828 A | 2/1992 | Jincks |
| D324,921 S | 3/1992 | Stanuch |
| 5,093,768 A | 3/1992 | Ohe |
| 5,097,397 A | 3/1992 | Stanuch |
| 5,097,612 A | 3/1992 | Williams |
| 5,101,326 A | 3/1992 | Roney |
| 5,122,943 A | 6/1992 | Pugh |
| 5,136,287 A | 8/1992 | Borenstein |
| 5,159,486 A | 10/1992 | Webb |
| 5,164,992 A | 11/1992 | Turk |
| 5,172,113 A | 12/1992 | Hamer |
| 5,182,647 A | 1/1993 | Chang |
| 5,187,547 A | 2/1993 | Niina |
| 5,193,201 A | 3/1993 | Tymes |
| 5,198,746 A | 3/1993 | Gyugyi |
| 5,198,756 A | 3/1993 | Jenkins |
| 5,220,235 A | 6/1993 | Wakimizu |
| 5,224,773 A | 7/1993 | Arimura |
| 5,233,204 A | 8/1993 | Fletcher |
| 5,235,498 A | 8/1993 | VanDulmen |
| 5,283,425 A | 2/1994 | Imamura |
| 5,291,196 A | 3/1994 | Defour |
| 5,296,840 A | 3/1994 | Gieffers |
| 5,298,738 A | 3/1994 | Gebert |
| 5,302,965 A | 4/1994 | Belcher |
| 5,313,187 A | 5/1994 | Choi |
| 5,321,593 A | 6/1994 | Moates |
| 5,357,123 A | 10/1994 | Sugawara |
| 5,357,409 A | 10/1994 | Glatt |
| 5,359,255 A | 10/1994 | Kawai |
| 5,359,669 A | 10/1994 | Shanley |
| 5,361,190 A | 11/1994 | Roberts |
| 5,362,971 A | 11/1994 | McMahon |
| 5,381,155 A | 1/1995 | Gerber |
| 5,400,140 A | 3/1995 | Johnston |
| 5,401,328 A | 3/1995 | Schmitz |
| 5,403,916 A | 4/1995 | Watanabe |
| 5,406,095 A | 4/1995 | Koyama |
| 5,410,328 A | 4/1995 | Yoksza |
| 5,410,453 A | 4/1995 | Ruskouski |
| 5,416,627 A | 5/1995 | Wilmoth |
| 5,419,065 A | 5/1995 | Lin |
| 5,420,444 A | 5/1995 | Sawase |
| 5,422,623 A | 6/1995 | Bader |
| 5,426,417 A | 6/1995 | Stanuch |
| 5,434,693 A | 7/1995 | Tanaka |
| 5,436,809 A | 7/1995 | Brassier |
| 5,450,301 A | 9/1995 | Waltz |
| 5,453,729 A | 9/1995 | Chu |
| 5,465,142 A | 11/1995 | Krumes |
| 5,471,371 A | 11/1995 | Koppolu |
| 5,475,241 A | 12/1995 | Harrah |
| 5,482,896 A | 1/1996 | Tang |
| 5,490,048 A | 2/1996 | Brassier |
| 5,490,049 A | 2/1996 | Montalan |
| 5,491,350 A | 2/1996 | Unno |
| 5,498,883 A | 3/1996 | Lebby |
| 5,514,627 A | 5/1996 | Lowery |
| 5,516,727 A | 5/1996 | Broom |
| 5,519,720 A | 5/1996 | Hirano |
| 5,526,237 A | 6/1996 | Davenport |
| 5,528,474 A | 6/1996 | Roney |
| 5,532,472 A | 7/1996 | Furuta |
| 5,546,219 A | 8/1996 | Iida |
| 5,546,496 A | 8/1996 | Kimoto |
| 5,552,780 A | 9/1996 | Knockeart |
| 5,557,257 A | 9/1996 | Gieffers |
| 5,567,036 A | 10/1996 | Theobald |
| 5,568,406 A | 10/1996 | Gerber |
| 5,569,939 A | 10/1996 | Choi |
| 5,575,459 A | 11/1996 | Anderson |
| 5,580,156 A | 12/1996 | Suzuki |
| 5,585,783 A | 12/1996 | Hall |
| 5,593,223 A | 1/1997 | Koizumi |
| 5,593,459 A | 1/1997 | Gamblin |
| 5,594,415 A | 1/1997 | Ishikawa |
| 5,598,290 A | 1/1997 | Tanaka |
| 5,604,480 A | 2/1997 | Lamparter |
| 5,606,444 A | 2/1997 | Johnson |
| 5,607,788 A | 3/1997 | Tomazic |
| 5,612,201 A | 3/1997 | DePlaen |
| 5,612,231 A | 3/1997 | Holm |
| 5,625,201 A | 4/1997 | Holm |
| 5,627,851 A | 5/1997 | Takahashi |
| 5,631,474 A | 5/1997 | Saitoh |
| 5,632,551 A | 5/1997 | Roney |
| 5,633,629 A | 5/1997 | Hochstein |
| 5,634,287 A | 6/1997 | Lamparter |
| 5,634,357 A | 6/1997 | Nutter |
| 5,634,711 A | 6/1997 | Kennedy |
| 5,635,902 A | 6/1997 | Hochstein |
| 5,635,981 A | 6/1997 | Ribacoff |

(56) References Cited

U.S. PATENT DOCUMENTS

| | | |
|---|---|---|
| 5,636,916 A | 6/1997 | Sokolowski |
| 5,643,357 A | 7/1997 | Breton |
| 5,644,291 A | 7/1997 | Jozwik |
| 5,656,829 A | 8/1997 | Sakaguchi |
| 5,660,461 A | 8/1997 | Ignatius |
| 5,661,645 A | 8/1997 | Hochstein |
| 5,661,742 A | 8/1997 | Huang |
| 5,664,448 A | 9/1997 | Swan |
| 5,674,000 A | 10/1997 | Kalley |
| 5,694,112 A | 12/1997 | VannRox |
| 5,696,500 A | 12/1997 | Diem |
| 5,697,175 A | 12/1997 | Schwartz |
| 5,705,047 A | 1/1998 | Lee |
| 5,707,891 A | 1/1998 | Izumi |
| 5,708,428 A | 1/1998 | Phillips |
| 5,722,760 A | 3/1998 | Chien |
| 5,726,535 A | 3/1998 | Yan |
| 5,726,786 A | 3/1998 | Heflinger |
| 5,734,337 A | 3/1998 | Kupersmit |
| 5,734,343 A | 3/1998 | Urbish |
| 5,736,925 A | 4/1998 | Knauff |
| 5,739,552 A | 4/1998 | Kimura |
| 5,739,592 A | 4/1998 | Rigsby |
| 5,758,947 A | 6/1998 | Glatt |
| 5,760,531 A | 6/1998 | Pederson |
| 5,781,105 A | 7/1998 | Bitar |
| 5,785,418 A | 7/1998 | Hochstein |
| 5,786,918 A | 7/1998 | Suzuki |
| 5,789,768 A | 8/1998 | Lee |
| 5,793,062 A | 8/1998 | Kish, Jr. |
| 5,796,376 A | 8/1998 | Banks |
| 5,804,822 A | 9/1998 | Brass |
| 5,805,081 A | 9/1998 | Fikacek |
| 5,805,209 A | 9/1998 | Yuge |
| 5,806,965 A | 9/1998 | Deese |
| 5,808,592 A | 9/1998 | Mizutani |
| 5,809,161 A | 9/1998 | Auty |
| 5,809,681 A | 9/1998 | Miyamoto |
| 5,810,833 A | 9/1998 | Brady |
| 5,826,965 A | 10/1998 | Lyons |
| 5,828,055 A | 10/1998 | Jebens |
| 5,831,155 A | 11/1998 | Hewitt |
| 5,838,024 A | 11/1998 | Masuda |
| 5,838,247 A | 11/1998 | Bladowski |
| 5,838,259 A | 11/1998 | Tonkin |
| 5,848,837 A | 12/1998 | Gustafson |
| 5,860,135 A | 1/1999 | Sugita |
| 5,872,646 A | 2/1999 | Alderman |
| 5,875,261 A | 2/1999 | Fitzpatrick |
| 5,884,997 A | 3/1999 | Stanuch |
| 5,898,381 A | 4/1999 | Gartner |
| 5,900,850 A | 5/1999 | Bailey |
| 5,917,637 A | 6/1999 | Ishikawa |
| 5,929,788 A | 7/1999 | Vukosic |
| 5,931,562 A | 8/1999 | Arato |
| 5,931,570 A | 8/1999 | Yamuro |
| 5,932,860 A | 8/1999 | Plesko |
| 5,934,694 A | 8/1999 | Schugt |
| 5,936,417 A | 8/1999 | Nagata |
| 5,939,996 A | 8/1999 | Kniveton |
| 5,948,038 A | 9/1999 | Daly |
| 5,959,752 A | 9/1999 | Ota |
| 5,960,135 A | 9/1999 | Ozawa |
| 5,965,879 A | 10/1999 | Leviton |
| 5,966,073 A | 10/1999 | Walton |
| 5,975,714 A | 11/1999 | Vetorino |
| 5,990,802 A | 11/1999 | Maskeny |
| 5,991,085 A | 11/1999 | Rallison |
| 6,009,650 A | 1/2000 | Lamparter |
| 6,014,237 A | 1/2000 | Abeles |
| 6,018,899 A | 2/2000 | Hanitz |
| 6,028,694 A | 2/2000 | Schmidt |
| 6,035,053 A | 3/2000 | Yoshioka |
| 6,035,055 A | 3/2000 | Wang |
| 6,035,074 A | 3/2000 | Fujimoto |
| 6,067,010 A | 5/2000 | Wang |
| 6,067,011 A | 5/2000 | Leslie |
| 6,067,018 A | 5/2000 | Skelton |
| 6,072,893 A | 6/2000 | Luo |
| 6,081,206 A | 6/2000 | Kielland |
| 6,081,304 A | 6/2000 | Kuriyama |
| 6,086,229 A | 7/2000 | Pastrick |
| 6,091,025 A | 7/2000 | Cotter |
| 6,094,148 A | 7/2000 | Henry |
| 6,095,661 A | 8/2000 | Lebens |
| 6,095,663 A | 8/2000 | Pond |
| 6,102,696 A | 8/2000 | Osterwalder |
| 6,106,137 A | 8/2000 | Adams |
| 6,111,671 A | 8/2000 | Bahuguna |
| 6,118,388 A | 9/2000 | Morrison |
| 6,121,898 A | 9/2000 | Moetteli |
| 6,126,087 A | 10/2000 | Hedger |
| 6,159,005 A | 12/2000 | Herold |
| 6,166,496 A | 12/2000 | Lys |
| 6,177,678 B1 | 1/2001 | Brass |
| 6,183,100 B1 | 2/2001 | Suckow |
| 6,243,492 B1 | 6/2001 | Kamei |
| 6,249,340 B1 | 6/2001 | Jung |
| 6,268,788 B1 | 7/2001 | Gray |
| 6,271,814 B1 | 8/2001 | Kaoh |
| 6,271,913 B1 | 8/2001 | Jung |
| 6,292,575 B1 | 9/2001 | Bortolussi |
| 6,293,904 B1 | 9/2001 | Blazey |
| 6,318,886 B1 | 11/2001 | Stopa |
| 6,352,358 B1 | 3/2002 | Lieberman |
| 6,367,949 B1 | 4/2002 | Pederson |
| 6,369,849 B1 | 4/2002 | Rzyski |
| 6,380,865 B1 | 4/2002 | Pederson |
| 6,389,115 B1 | 5/2002 | Swistock |
| 6,389,155 B2 | 5/2002 | Funayama |
| 6,396,954 B1 | 5/2002 | Kondo |
| 6,400,828 B2 | 6/2002 | Covell |
| 6,411,022 B1 | 6/2002 | Machida |
| 6,424,269 B1 | 7/2002 | Pederson |
| 6,461,008 B1 | 10/2002 | Pederson |
| 6,462,669 B1 | 10/2002 | Pederson |
| 6,469,631 B1 | 10/2002 | Pederson |
| 6,472,996 B1 | 10/2002 | Pederson |
| 6,476,726 B1 | 11/2002 | Pederson |
| 6,504,487 B1 | 1/2003 | Pederson |
| 6,547,410 B1 | 4/2003 | Pederson |
| 6,548,967 B1 | 4/2003 | Dowling |
| 6,590,343 B2 | 7/2003 | Pederson |
| 6,590,502 B1 | 7/2003 | Pederson |
| 6,600,274 B1 | 7/2003 | Hughes |
| 6,600,899 B1 | 7/2003 | Radomsky |
| 6,614,359 B2 | 9/2003 | Pederson |
| 6,623,151 B2 | 9/2003 | Pederson |
| 6,683,590 B1 | 1/2004 | Pang |
| 6,690,294 B1 | 2/2004 | Zierden |
| 6,693,551 B2 | 2/2004 | Pederson |
| 6,705,745 B1 | 3/2004 | Pederson |
| 6,707,389 B2 | 3/2004 | Pederson |
| 6,788,217 B2 | 9/2004 | Pederson |
| 6,814,459 B2 | 11/2004 | Pederson |
| 6,819,677 B1 | 11/2004 | Nouzovsky |
| 6,822,578 B2 | 11/2004 | Pederson |
| 6,844,824 B2 | 1/2005 | Vukosic |
| 6,879,263 B2 | 4/2005 | Pederson |
| 6,892,942 B1 | 5/2005 | Widl |
| 7,023,469 B1 | 4/2006 | Olson |
| 7,046,160 B2 | 5/2006 | Pederson |
| 7,102,665 B1 | 9/2006 | Chandler |
| 7,103,614 B1 | 9/2006 | Kucik |
| 7,183,895 B2 | 2/2007 | Bazakos |
| 7,230,884 B2 | 6/2007 | Shemesh |
| 7,324,757 B2 | 1/2008 | Wilson |
| 7,439,847 B2 | 10/2008 | Pederson |
| 7,548,698 B2 | 6/2009 | Yamamoto |
| 7,557,521 B2 | 7/2009 | Lys |
| 7,583,901 B2 | 9/2009 | Nakagawa |
| 8,126,554 B2 | 2/2012 | Kane |
| 2002/0109892 A1 | 8/2002 | Seto |
| 2003/0025608 A1 | 2/2003 | Pederson |

(56) References Cited

U.S. PATENT DOCUMENTS

| | | |
|---|---|---|
| 2003/0118216 A1 | 6/2003 | Goldberg |
| 2003/0156037 A1 | 8/2003 | Pederson |
| 2003/0169164 A1 | 9/2003 | Lau |
| 2003/0185340 A1 | 10/2003 | Frantz |
| 2003/0222587 A1 | 12/2003 | Dowling |
| 2004/0044709 A1 | 3/2004 | Cabrera |
| 2004/0151344 A1 | 8/2004 | Farmer |
| 2004/0153229 A1 | 8/2004 | Gokturk |
| 2004/0208599 A1 | 10/2004 | Swartz |
| 2005/0002673 A1 | 1/2005 | Okano |
| 2005/0005794 A1 | 1/2005 | Inukai |
| 2005/0057941 A1 | 3/2005 | Pederson |
| 2005/0111700 A1 | 5/2005 | OBoyle |
| 2006/0056855 A1 | 3/2006 | Nakagawa |
| 2006/0132382 A1 | 6/2006 | Jannard |
| 2006/0149813 A1 | 7/2006 | Janik |
| 2006/0213731 A1 | 9/2006 | Lesesky |
| 2007/0104239 A1 | 5/2007 | Koga |
| 2007/0110446 A1 | 5/2007 | Hong |
| 2007/0145915 A1 | 6/2007 | Roberge |
| 2007/0160373 A1 | 7/2007 | Biegelsen |
| 2007/0269219 A1 | 11/2007 | Teller |
| 2008/0044188 A1 | 2/2008 | Kagawa |
| 2008/0154101 A1 | 6/2008 | Jain |
| 2008/0227463 A1 | 9/2008 | Hizume |
| 2009/0129782 A1 | 5/2009 | Pederson |
| 2009/0157545 A1 | 6/2009 | Mobley |

FOREIGN PATENT DOCUMENTS

| | | | |
|---|---|---|---|
| CA | 2164920 | 6/1996 | |
| CA | WO 2007/003037 | * 1/2007 | ............. H05B 41/36 |
| DE | 4304216 | 8/1994 | |
| DE | 19502735 | 8/1996 | |
| DE | 19548639 | 6/1997 | |
| DE | 19721673 | 11/1997 | |
| DE | 29712281 | 1/1998 | |
| EP | 0326668 | 8/1989 | |
| EP | 2658024 | 8/1991 | |
| EP | 0468822 | 1/1992 | |
| EP | 0531184 | 3/1993 | |
| EP | 0531185 | 3/1993 | |
| EP | 2680861 | 3/1993 | |
| EP | 0596782 | 5/1994 | |
| EP | 0633163 | 1/1995 | |
| EP | 2707222 | 1/1995 | |
| EP | 0688696 | 12/1995 | |
| EP | 0709818 | 5/1996 | |
| EP | 0793403 | 9/1997 | |
| EP | 0887783 | 12/1998 | |
| EP | 0890894 | 1/1999 | |
| EP | 0896898 | 2/1999 | |
| EP | 0967590 | 12/1999 | |
| EP | 1043189 | 10/2000 | |
| EP | 1564914 | 8/2005 | |
| FR | 2800500 | 5/2001 | |
| GB | 1241369 | 8/1971 | |
| GB | 2069257 | 8/1981 | |
| GB | 2139340 | 11/1984 | |
| GB | 2175428 | 11/1986 | |
| GB | 2240650 | 2/1990 | |
| GB | 2111270 | 6/1993 | |
| GB | 2272791 | 5/1994 | |
| GB | 2292450 | 2/1996 | |
| GB | 2311401 | 9/1997 | |
| GB | 2323618 | 9/1998 | |
| GB | 2330679 | 4/1999 | |
| GB | 2359179 | 8/2001 | |
| GB | 2359180 | 8/2001 | |
| JP | 60143150 | 7/1985 | |
| JP | S63153166 | 6/1988 | |
| JP | 6333403 | 12/1994 | |
| JP | 06333403 | 12/1994 | |
| JP | 8002341 | 1/1996 | |
| JP | 08002341 | 1/1996 | |
| JP | 10098778 | 4/1998 | |
| WO | 9750070 | 12/1997 | |
| WO | 9935634 | 7/1999 | |
| WO | 9942985 | 8/1999 | |
| WO | 9949435 | 9/1999 | |
| WO | 9949446 | 9/1999 | |
| WO | 0074975 | 12/2000 | |
| WO | 0101675 | 1/2001 | |
| WO | 0110674 | 2/2001 | |
| WO | 0110675 | 2/2001 | |
| WO | 0110676 | 2/2001 | |
| WO | 0225842 | 3/2002 | |
| WO | 02025842 | 3/2002 | |
| WO | 02073836 | 9/2002 | |
| WO | 2007003037 | 11/2007 | |

OTHER PUBLICATIONS

Oral et al.: Modern lighting sources and controls for energy efficient lighting and a smart control algorithm application, Oct. 2010, WSEAS Transactions on Systems, Issue 10, vol. 9, pp. 1098-1108.*
Hawaiian Electric Company, Inc.: Powerlines—Energy Efficiency Takes-off at Honolulu International Airport, Spring 2008, pp. 1-13.
Pacific Northwest National Laboratory: Demosnstration Assessment of Light-Emitting Diode (LED) Parking Lot Lighting, Phase I, Jun. 2010, pp. 1-37.
Van Wicklen, Garrett L.: Using LED Lights Can Reduce Your Electricity Costs, Dec. 2005, Cooperative Extension Service, Applied Poultry Engineering News, vol. 3, No. 1, pp. 1-4.
Akhavan et al., "High-Speed Power-Efficient Indoor Wireless Infrared Communication Using Code Combining-Part I," IEEE Trnsactions on Communications, vol. 50, No. 7, Jul. 2002, pp. 1098-1109.
Djahani et al., "Analysis of Infrared Wireless Links Employing Multibeam Transmitters and Imaging Diversity Receivers," IEEE Transactions on Communications, vol. 48, No. 12, Dec. 2000, pp. 2077-2088.
Kahn et al., "Wireless Infrared Communications," Proceedings of the IEEE, vol. 85, No. 2, Feb. 1997, pp. 265-298.
Jeffrey B. Carruthers, "Wireless Infrared Communications," Wiley Encyclopedia of Telecommunications, 2002.
Komine T. et al., "Integrated System of White LED Visible-Light Communicaiton and Power-Line Communication," 20020915; 20020915-20020918, vol. 4, Sep. 15, 2002, pp. 1762-1766.

* cited by examiner

METHOD OF PROVIDING LUMENS AND TRACKING OF LUMEN CONSUMPTION

This application is a Continuation of U.S. patent application Ser. No. 13/350,463, filed on Jan. 13, 2012, which claims the benefit of U.S. Provisional Application No. 61/432,949, entitled "Method of Providing Lumens and Tracking of Lumen Consumption," by John C. Pederson, and filed on Jan. 14, 2011, the entire content of which is incorporated herein by reference.

TECHNICAL FIELD

The disclosure relates to light emitting diodes (LEDs) and, more particularly, to managing the costs associated with LED lighting fixtures.

BACKGROUND

Present communication techniques using radiofrequency (RF) suffer from a number of problems. First, there are security concerns because transmissions using RF can be easily intercepted, in part because of the fact that RF signals are designed to radiate signals in all directions. Second, the heavy regulation by the Federal Communications Commission (FCC) and its control of the frequencies that may be used for RF transmission often present daunting challenges to RF broadcasters. Third, RF by its very nature is susceptible to interference and produces noise.

In contrast to RF communications, light sources used for communication are extremely secure due to the fact that they are focused within a narrow beam, requiring placing equipment within the beam itself for interception. Also, because the visible spectrum is not regulated by the FCC, light sources can be used for communications purposes without the need of a license. And, light sources are not susceptible to interference nor do they produce noise that can interfere with other devices.

Light emitting diodes (LEDs) can be used as light sources for data transmission, as described in U.S. Pat. Nos. 6,879,263 and 7,046,160, the entire contents of each being expressly incorporated herein by reference. LEDs have quick response to "ON" and "OFF" signals, as compared to the longer warm-up and response times associated with fluorescent lighting, for example. LEDs are also efficient in producing light, as measured in lumens per watt. Recent developments in LED technology, such as high brightness blue LEDs, which in turn paved the way for white LEDs, have made LEDs a practical alternative to conventional light sources. As such, LED technology provides a practical opportunity to combine lighting and communication. This combination of lighting and communication allows ubiquitous light sources such as street lights, home lighting, and office building lighting, for example, to be converted to, or supplemented with, LED technology to provide for communications while simultaneously producing light for illumination purposes.

Regarding office buildings, building management is a complex science which incorporates and governs all facets of human, mechanical and structural systems associated with buildings. As a result of the complexity, most commercial buildings are managed by commercial property management companies with great expertise. Both at the time of construction and throughout the life-cycle of a building, the interrelationships between people and the mechanical and structural systems are most desirably evaluated. Where possible and cost-effective, human interactions with a building and associated mechanical systems will be optimized, in turn providing the greatest benefit to both the owners and those who use the facilities afforded by the building. Noteworthy is the fact that building users may include both regular occupants such as individual or commercial tenants, and also transient occupants such as visitors, guests, or commercial customers.

Building management includes diverse facets, some which are simply representations of the building and associated systems and people, and other facets which are tangible. Exemplary of representations are accounting or financial monitoring responsibilities which will including record keeping control and assurance of financial transactions involving tenants, owners, and service providers. Exemplary of the physical or tangible responsibilities are physical development and maintenance, including identification of need for features, improvements, maintenance and the assurance of the execution of the same. As is well understood by those highly versed in building management, the diverse responsibilities and extent of information required to manage a building is often quite overwhelming.

One very important area associated with building management is lighting or illumination. While often perceived as a simple task of providing lights, this seemingly simple task has much research and science behind a well-designed lighting system. This is because safety, productivity and general well-being of occupants depend heavily on proper lighting.

Many factors need to be considered at the time of construction or remodeling to facilitate proper lighting design. Intended usage of a space is important in illumination design consideration, since this will dictate necessary illumination levels, times and duration of use, and anticipated cycling of the illumination. In other words, a supply closet will not ordinarily be designed for around-the-clock illumination, and may instead by configured to operate on a switch, or alternatively a motion detector with relatively short-delay turn-off when no motion is detected. The use of appropriate switches and motion detectors helps to reduce the energy required for a building to function with occupants, and simultaneously increases the life of many illumination components such as light sources (light bulbs and equivalents thereto) since the light sources are only required intermittently. As another example, a room where movies, slides, computer or other visual or audio-visual presentations are given, such as a boardroom or classroom, will preferably have light controls such as separate switches or switches and dimmer controls which enable the entire room to be well lit or alternatively maintain a minimum level of illumination normally opposite to where the presentation is displayed. This minimum level of illumination enables occupants sufficient light for note-taking, safe movement and other important activities, without interfering with the legibility of a presentation. In yet another example, a primary work-space such as a desk or kitchen counter will require illumination that does not cast shadows on the work space while work is being performed. Complementary illumination, such as windows or skylights, is also important in design consideration.

Nearly all public buildings rely on a great many lamps positioned throughout the interior of the building, such as along hall corridors and in each room, and also about the exterior. These lights have historically been activated manually, though more recently, a small but growing number are activated according to occupancy, proximity or motion sensors, typically incorporating the well-known Infra-Red (IR) motion sensors. Architects are commonly employed to assist not only with a floor plan of physical spaces, but also with the proper selection and layout of lighting to best complement the floor plan and usage of each space within a building. As may be appreciated, illumination of a space is determined at the time of production of blueprints, in anticipation of construction. The illumination that has been chosen for a space is essentially fixed during building construction. Changes may be made later, but not without substantial additional expense that will, for exemplary purposes, often include removal of parts of or entire walls, with the accompanying disruption of the space. Often the space is unavailable for use during the entire duration of a remodeling project.

Further complicating the issue of illumination is the type of light bulb that may be most appropriate for a space or location. Original electric light bulbs were incandescent. With sufficient electrical energy, which is converted to heat within an incandescent bulb filament, the filament will emit visible light. This is similar to a fire, where with enough heat, visible light is produced. As might also be appreciated though, incandescent bulbs produce far more heat than light. The color of the light from these bulbs is also most commonly quite yellow, casting a warm hue at a color temperature typically in the vicinity of 3,000 degrees Kelvin. Warm hues are often prized in relaxed settings such as those of a living room or dining room, more closely resembling gentle candle light. However, in contrast thereto, work and study environments are more preferably illuminated with light of more blue content, more closely resembling daylight with color temperatures of approximately 6,000 degrees Kelvin. Daylight color temperatures are not practically obtained using an incandescent bulb. In addition, these incandescent bulbs have only a few thousand hour life expectancy, even with more than a century of improvements, because the extreme temperatures required for the filament to light also gradually evaporates the filament material. Finally, the thermal mass of the filament greatly influences how quickly the filament both illuminates and extinguishes. In spite of the many limitations, incandescent bulbs are still in fairly wide-spread use today.

An alternative to incandescent light bulbs in common use today is the fluorescent bulb. A fluorescent light bulb uses a small amount of mercury in vapor state. High voltage electricity is applied to the mercury gas, causing the gas to ionize and generate some visible light, but primarily Ultraviolet (UV) light. UV light is harmful to humans, being the component that causes sun burns, so the UV component of the light must be converted into visible light. The inside of a fluorescent tube is coated with a phosphorescent material, which when exposed to ultraviolet light glows in the visible spectrum. This is similar to many glow-in-the-dark toys and other devices that incorporate phosphorescent materials. As a result, the illumination from a fluorescent light will continue for a significant time, even after electrical power is discontinued, which for the purposes of the present disclosure will be understood to be the latent period or latency between the change in power status and response by the phosphor. As the efficiencies and brightness of the phosphors has improved, so in many instances have the delays in illumination and extinguishing, or latency, increased. Through the selection of many different modern phosphorescent coatings at the time of manufacture, fluorescent bulbs may be manufactured that produce light from different parts of the spectrum, resulting in manufacturing control of the color temperature, or hue or warmness of a bulb.

The use of fluorescent bulbs, even though quite widespread, is controversial for several reasons. One source states that all pre-1979 light ballasts emit highly toxic Polychlorinated BiPhenyls (PCBs). Even if modern ballasts are used, fluorescent bulbs also contain a small but finite amount of mercury. Even very small amounts of mercury are sufficient to contaminate a property. Consequently, both the manufacture and disposal of mercury-containing fluorescent tubes is hazardous. Fluorescent lighting has also been alleged to cause chemical reactions in the brain and body that produce fatigue, depression, immuno-suppression, and reduced metabolism. Further, while the phosphor materials may be selected to provide hue or color control, this hue is fixed at the time of manufacture, and so is not easily changed to meet changing or differing needs for a given building space.

Other gaseous discharge bulbs such as halide, mercury or sodium vapor lamps have also been devised. Halide, mercury and sodium vapor lamps operate at higher temperatures and pressures, and so present undesirably greater fire hazards. In addition, these bulbs present a possibility of exposure to harmful radiation from ruptured outer bulbs that go undetected. Furthermore, mercury and sodium vapor lamps generally have very poor color-rendition-indices, meaning the light rendered by these bulbs is quite different from ordinary daylight, distorting human color perception. Yet another set of disadvantages has to do with the starting or lighting of these types of bulbs. Mercury and sodium vapor lamps both exhibit extremely slow starting times, often measured by many minutes. The in-rush currents during starting are also commonly large. Many of the prior art bulbs additionally produce significant and detrimental noise pollution, commonly in the form of a hum or buzz at the frequency of the power line alternating current. In some cases, such as fluorescent lights, ballasts change dimension due to magnetostrictive forces. Magnetic field leakage from the ballast may undesirably couple to adjacent conductive or ferromagnetic materials, resulting in magnetic forces as well. Both types of forces will generate undesirable sound. Additionally, in some cases a less-optimal bulb may also produce a buzzing sound.

When common light bulbs are incorporated into public and private facilities, the limitations of existing bulb technologies often will adversely impact building occupants. As just one example, in one school the use of full-spectrum lamps in eight experimental classrooms decreased anxiety, depression, and inattention in students with SAD (Seasonal Affective Disorder). The connection between lighting and learning has been conclusively established by numerous additional studies. Mark Schneider, with the National Clearinghouse for Educational Facilities, declares that ability to perform requires "clean air, good light, and a quiet, comfortable, and safe learning environment." Unfortunately, the flaws in much of the existing lighting have been made worse as buildings have become bigger. The foregoing references to schools will be understood to be generally applicable to commercial and manufacturing environments as well, making even the selection of types of lights and color-rendition-indexes very important, again depending upon the intended use for a space. Once again, this selection will be fixed, either at the time of construction when a particular lighting fixture is installed, or at the time of bulb installation, either in a new fixture or with bulb replacements.

A second very important area associated with building management is energy management. The concern for energy management is driven by the expense associated with energy consumed over the life of a building. Energy management is quite challenging to design into a building, because many human variables come into play within different areas within a building structure. Considering the foregoing discussion of lighting, different occupants will have different preferences and habits. Some occupants may regularly forget to turn off lights when a space is no longer being occupied, thereby wasting electricity and diminishing the useful life of the light bulbs. In another instance, one occupant may require full illumination for that occupant to operate efficiently or safely within a space, while a second occupant might only require a small amount or local area of illumination. Further complicating the matter of energy management is the fact that many commercial establishments may have rates based upon peak usage. A business with a large number of lights that are controlled with a common switch may have peak demands large relative to total consumption of power, simply due to the relatively large amount of power that will rush in to the circuit. Breaking the circuit into several switches may not adequately address inrush current, since a user may switch more than one switch at a time, such as by sliding a hand across several switches at once. Additionally, during momentary or short-term power outages, the start-up of electrical devices by the power company is known to cause many problems, sometimes harming either customer equipment or power company devices. Control over inrush current is therefore very desirable, but not economically viable in the prior art.

Energy management also includes consideration for differences in temperature preferred by different occupants or for different activities. For exemplary purposes, an occupant of a first office space within a building may prefer a temperature close to 68 degrees Fahrenheit, while a different occupant in a second office space may prefer a temperature close to 78 degrees Fahrenheit. The first and second office spaces may even be the same office space, just at different times of day. For exemplary purposes, an employee working in a mail room from 8 a.m. until 4 p.m. may be replaced by a different mail room employee who works from 4 p.m. until 12 a.m. Heating, Ventilation, and Air Conditioning (HVAC) demand or need is dependent not only upon the desired temperature for a particular occupant, but also upon the number of occupants within a relatively limited space. In other words, a small room with many people will require more ventilation and less heating than that same room with only one occupant.

With careful facility design, considerable electrical and thermal energy can be saved. Proper management of electrical resources affects every industry, including both tenants and building owners. In the prior art, this facility design has been limited to selection of very simple or basic switches, motion detectors, and thermostats, and particular lights, all fixed at the time of design, construction or installation.

A third very important area associated with building management is security. Continuing to use a school as but one example of a public building, a one-room country school fifty years ago was made up of one teacher who knew well the small number of pupils. Security consisted of a simple padlock on a wooden door. The several windows on one side of the room provided light. They were locked but almost never broken into, for nothing of major value, even during the Depression, enticed potential thieves.

Architecture changed as the years passed. Buildings were enlarged as school populations increased. Students started to conceal books, outerwear, valuables, and occasionally even weapons in enclosed lockers. Indoor lighting was required. Eventually as society became more hazardous, security had to be provided in many schools in the form of personnel who were required to patrol both outside and inside schools in order to provide a measure of safety.

In many public buildings, including schools, modern security presently screens a building's occupants to ensure that they belong or have proper authorization to enter the building. Security must also check for weapons, drugs, and even explosives. Thus, modern security personnel are often responsible for property as well as people. As the types of potential perils increase, so does the need for personnel, to process occupants through more and more stations. For exemplary purposes, in schools, airports, court houses, and other public facilities, one or more guards may check identification, admission badges or paperwork, while one or more other guards monitor metal detectors. One or more additional guards may be monitoring drug sniffing dogs or equipment, or spot checking bags. Unfortunately, the possibilities of duplication and/or forgery of credentials, or of hostile powers infiltrating security, or other criminal methods demonstrate the potential weaknesses of the present system, which depends upon a large number of security employees. Motion sensors and other prior art electronic security measures, while often beneficial, occasionally fail even when used in combination with security personnel to provide adequate protection. On the outside of a building, motion sensors may be activated by strong winds, stray animals, passing vehicles, or blowing debris. Inside, they operate only for a specific time; a room's occupant, if not moving about, may suddenly be in the dark and must re-activate the light by waving or flailing about.

An increasingly complex, and therefore hazardous, society requires increasingly extensive patrols and safeguards. Current security system, which must rely on increasing the numbers of guards and security devices, are subject to inherent defects and extraordinary expense, generally rendering them inadequate even with the best of intention.

Yet another very important area associated with building management is guidance control and indication, which impacts building security, as well as building convenience and efficiency for occupants. In buildings having many alternative hallways or paths, such as are commonly found in hospitals and other large public facilities, directions are often clumsy and difficult for visitors or emergency personnel to follow. Old-fashioned directories may be hard to locate or decipher, especially for non-English speakers or for persons with little or no time, again such as emergency personnel. Consequently, some buildings provide color stripes along walls that serve as color coding to guide visitors to various areas within the building. Unfortunately, the number of color stripes that may be patterned is quite limited, and the expense and defacing of appearance associated therewith is undesirable. Furthermore, such striping does not completely alleviate confusion, and the color stripes can only serve as general guides to commonly visited areas.

In addition to their numerous uses with building management, LEDs can be used in networking applications. In any network, a variety of client devices will communicate with one or more host devices. The host may provide connection to a Local Area Network (LAN), sometimes referred to as an Intranet, owing to the common use of such a network entirely within an office space, building, or business. The host may additionally or alternatively provide connection to a Wide Area Network (WAN), commonly describing a network coupling widely separated physical locations which are connected together through any suitable connection, including for exemplary purposes but not solely limited thereto such means as fiber optic links, T1 lines, Radio Frequency (RF) links including cellular telecommunications links, satellite connections, DSL connections, or even Internet connections. Generally, where more public means such as the Internet are used, secured access will commonly separate the WAN from general Internet traffic. The host may further provide access to the Internet.

A variety of client devices have heretofore been enabled to connect to host devices. Such client devices may commonly include computing devices of all sorts, ranging from handheld devices such as Personal Digital Assistants (PDAs) to massive mainframe computers, and including Personal Computers (PCs). However, over time many more devices have been enabled for connection to network hosts, including for exemplary purposes printers, network storage devices, cameras, other security and safety devices, appliances, HVAC systems, manufacturing machinery, and so forth. Essentially, any device which incorporates or can be made to incorporate sufficient electronic circuitry may be so linked as a client to a host.

Existing client devices are designed to connect to host network access points through wired connections, like copper wire, for example, fiber optic connections, or as wireless connections, such as wireless routers. In the case of a wired system, whether through simple wire, twisted wire, co-axial cable, fiber optics or other line or link, the host and client are tethered together through this physical communications channel. The tether, as may be appreciated, limits movement of the client relative to the host, is often unsightly and hard to contain in a workspace, and so may even be or become a tripping hazard. In addition, electrical connectors such as jacks must be provided, and these connectors necessarily limit the number of access points and locations. The installation of connectors defaces walls, sometimes rendering them unsuitable for a particular desired application, and yet they add undesirable installation expense, whether during new construction or in retrofitting an existing building structure.

In contrast, in the case of wireless routers, an RF signal replaces the physical communications channel with a radio channel. This advantageously eliminates the wire or fiber tether between client and host. Instead, client devices in a wireless system try through various broadcasts and signal receptions to find an access point that will have adequate transmission and reception, generally within a certain signal range which may range from a few meters to as many as several tens of meters. The systems are programmed to bridge from a host access point to various client devices through known exchanges of information, commonly described as communications protocols or handshakes. Depending upon the communications channel, a variety of client connection devices are utilized such as PCMCIA or PC cards, serial ports, parallel ports, SIMM cards, USB connectors, Ethernet cards or connectors, FireWire interfaces, Bluetooth compatible devices, infrared/IrDA devices, and other known or similar components.

The security of these prior art wireless devices can be compromised in that they are vulnerable to unauthorized access or interception, and the interception may be from a significant distance, extending often well beyond physical building and property boundaries. Moreover, reliability can be hindered by interference from an appliance such as a microwave oven.

Buildings can encompass a very large number of rooms or discrete spaces, each functioning relatively independently from each other. Where the rooms or discrete spaces together form a larger entity such as a business, public institution or facility, or the like, which have attempted to include synchronized time keeping throughout the entity. A large number of buildings, both public and private, have synchronized clocks installed therein.

These same buildings also have a number of additional features including, for exemplary purposes though not limited thereto, fire and smoke detection, temperature control, and public address. Because of the ever-changing nature of a building and the best practices associated therewith, it can be quite difficult if not impossible to keep all areas within a building up to date with best practices or preferred capabilities. One method of desirable features or capabilities within a building space is through the use of electrical wiring adequate to accommodate the features or capabilities, particularly when the features or capabilities are identified subsequent to original construction.

For exemplary purposes, a building may accommodate very different numbers of occupants at different times within a relatively enclosed space, such as a meeting or class room. The number of occupants is known to significantly alter the temperature and associated need for HVAC control. Furthermore, other factors, such as weather conditions and sunlight or lack thereof through windows in a room may have as much or greater effect on the need for HVAC control. However, many older buildings were only provided with a single central thermostat, providing the same amount of heating or air conditioning to a room or other space regardless of demand for the same. Newer HVAC systems enable control, through electrically controlled dampers or vents within the HVAC system to much more precisely respond to the needs of a single space or room within a building. However, without providing wiring within the room to accommodate the thermostat and various duct controls, the room may not be individually controlled.

Even where a building is originally provided with appropriate wiring for each electrical system or component desired, necessary remodeling may critically alter the need. As one example, consider when a room or space is subdivided into two smaller spaces. Existing wiring only provides for electrical connection to one set of devices for one room. In this case, it may be necessary to run new wires back to one or more central locations, utility rooms, or the like to accommodate the new room and devices within the room.

More buildings are incorporating wireless networks within the building, the networks which are intended to reduce the need for wiring alterations and additions practiced heretofore. However, these wireless networks are not contained within the walls of a building, and so they are subject to a number of limitations. One of these is the lack of specific localization of a signal and device. For exemplary purposes, even a weak Radio-Frequency (RF) transceiver, in order to communicate reliably with all devices within a room, will have a signal pattern that will undoubtedly cross into adjacent rooms. If only one room or space in a building is to be covered, this signal overlap is without consequence. However, when many rooms are to be covered by different transceivers, signal overlap between transceivers requires more complex communications systems, including incorporating techniques such as access control and device selection based upon identification. Since the radio signal is invisible, detection of radiant pattern and signal strength are difficult and require special instruments. Further, detection of interference is quite difficult. Finally, such systems are subject to outside tapping and corruption, since containment of the signal is practically impossible for most buildings.

Another issue associated with use of conventional and LED lighting sources concerns the difficulty in quantifying the amount of use of a light source, as well as the amount of degradation or exhaustion of a light source before light source failure.

All U.S. patents and applications and all other published documents mentioned anywhere in this application are incorporated herein by reference in their entirety.

SUMMARY

In general, this disclosure describes techniques for compensating an LED light fixture provider for generation of photons by one or more LED light fixtures used by a customer. More particularly, in accordance with various techniques of this disclosure, an LED light fixture provider receives compensation from customers using the provider's LED light fixtures, and the provider pays the customer's electricity supplier, on behalf of the customer, a monetary amount for the cost of the electricity used to generate the photons by each LED light fixture on the customer's premises. In this manner, the LED light fixture provider has inserted itself between the customer and the electricity supplier, e.g., a power company, in order to generate a revenue stream for the provider.

In one example, this disclosure is directed to a method of compensating an LED light fixture provider for generation of photons by one or more LED light fixtures used by a customer. The method comprises receiving a pre-determined monetary amount as compensation for photons generated by the LED light fixtures, maintaining a contractual relationship with the customer for a period of time in exchange for the pre-determined monetary amount, the contractual relationship including a requirement that the provider pay the customer's electricity supplier for the electricity consumed by the LED light fixtures used by the customer, determining, with a meter associated with each respective LED light fixture, the amount of electricity consumed by the LED light fixtures used by the customer over a period of time, in response to the determination and on behalf of the customer, submitting payment to the customer's electricity supplier for the electricity consumed by the LED light fixtures used by the customer.

In another example, this disclosure is directed to a method of compensating an LED light source provider for generation of photons from at least one LED light source used by a customer. The method comprises receiving a pre-determined monetary amount as compensation for photons generated by the at least one LED light source, maintaining a contractual relationship with the customer for a period of time in exchange for the pre-determined monetary amount, the contractual relationship including a requirement that the provider pay the customer's electricity supplier for the electricity consumed by the at least one LED light source, determining, with a meter associated with each respective LED light source, the amount of electricity consumed by the at least one LED light source over a period of time, and in response to the determination and on behalf of the customer, submitting payment to the customer's electricity supplier for the electricity consumed by the at least one LED light source.

The details of one or more aspects of the disclosure are set forth in the accompanying drawings and the description below. Other features, objects, and advantages will be apparent from the description and drawings, and from the claims.

DETAILED DESCRIPTION

Figure 1:
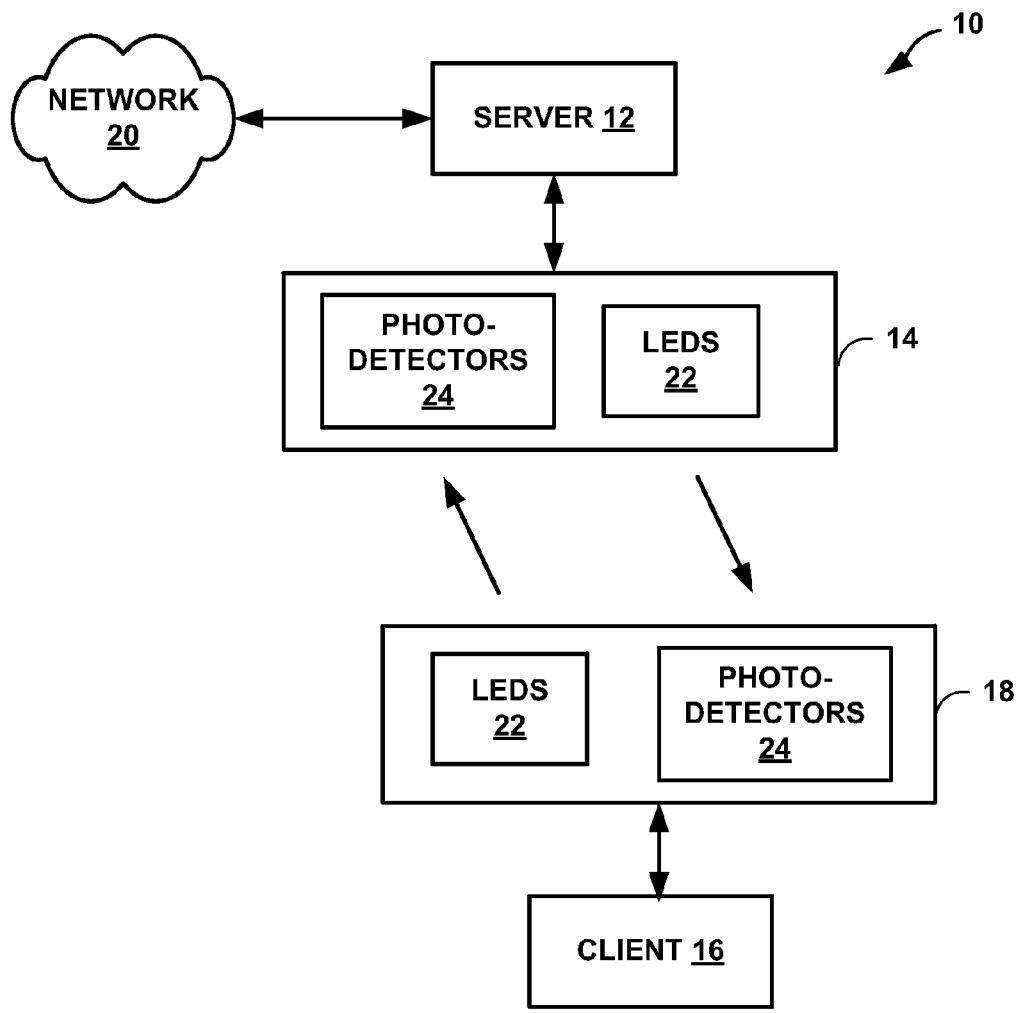
FIG. 1 is a block diagram illustrating one example communication system that may be used with the techniques of this disclosure.

FIG. 1 is a block diagram illustrating one example communication system that may be used with the techniques of this disclosure. The communication system in FIG. 1, shown generally at 10, includes a server computer 12 connected to a server optical transceiver (XCVR) 14, e.g., via a Universal Serial Bus (USB) cable or the like, and a client computer 16 connected to a client optical transceiver 18, e.g., via a USB cable or the like, that generates pulsed light signals for pulsed light communication. Server 12 is in communication with network 20 via a Category (CAT) 5 cable, CAT-6 cable, or the like, for example.

Server optical XCVR 14 and client optical XCVR 18 are substantially similar in at least one example and, as such, will be described together for purposes of conciseness. Optical XCVRs 14, 18 may include one or more light emitting diodes ("LEDs") 22 for transmission of light and one or more photodetectors 24 for receiving transmitted light. LEDs and photodetectors are well known to those of ordinary skill in the art and, as such, their specific operation will not be described in detail. The term "photodetector" includes "photodiodes" and all other devices capable of converting light into current or voltage. The terms photodetector and photodiode are used interchangeably throughout this disclosure. The use of the term photodiode is not intended to restrict embodiments of the invention from using alternative photodetectors that are not specifically mentioned herein.

In at least one example, the XCVR circuit may include an RS232 to USB conversion module. The transmit pin on the USB conversion module drives the driver electronics for the LEDs. In some embodiments, the XCVR circuit includes high intensity LEDs. In some embodiments it may be desirable to use high intensity LEDs to enhance lighting, to improve data transmission, or both. In at least one embodiment, a 12 volt direct current (DC), 3 amp power supply is sufficient for powering an array of high intensity LEDs.

In some embodiments, the XCVR circuit further includes an amplifier for amplifying the optical signal received by the photodiode. The output of the amplifier may be fed into level shifting circuitry to raise the signal to TTL levels, for example. The signal is then fed into the receive pin of the RS232 to USB module.

In one example, an alternating current (AC) source such as a line voltage, e.g., 120 Volt (V) provided by an electricity supplier, e.g., power company, can supply power to the XCVR circuit. In some embodiments, a 9V battery can be used to power the amplifier circuitry. Significant noise is generated by switching high brightness LEDs on and off, e.g., at 200 milliamps (mA) and 500 kilobits per second (kbps). Powering the amplifier with a battery can reduce these noise problems by reducing or removing transients.

It should be noted that in some embodiments, the LED can both emit and receive light. In such an embodiment, the LED can act both as a transmitter or receiver, i.e., a transceiver ("XCVR"). More information on such bi-directional LEDs can be found in U.S. Pat. No. 7,072,587, the entire contents of which are expressly incorporated herein by reference.

In at least one embodiment, the optical XCVRs, or circuitry attached thereto, include modulation circuitry for modulating a carrier signal with the optical signal. Modulation can be used to eliminate bias conditions caused by sunlight or other interfering light sources. Digital modulation can be accomplished by using phase-shift keying, amplitude-shift keying, frequency-shift keying, quadrature modulation, or any other digital modulation technique known by those of ordinary skill. Similarly, such XCVRs can include demodulation circuitry that extracts the data from the received signal. Modulation and demodulation techniques for modulating light signals are described in U.S. Pat. Nos. 5,245,681, and 6,137,613, the entire contents of each being expressly incorporated herein by reference.

It may be desirable in some embodiments to further include filters or filter circuitry to prevent unwanted light from being amplified. For example, the optical baseband signal can be modulated at 100 kHz and then transmitted. The XCVR that receives the 100 kHz modulated signal can include a filter stage centered at 100 kHz. The filtered 100 kHz signal can then be input into the amplifier circuitry, thereby preventing amplification of unwanted signals. In some embodiments, it can be desirable to amplify the transmitted signal first, and then filter out the baseband signal.

Additional information regarding data communication can be found in International Publication Number WO 99/49435, the entire contents of which are expressly incorporated herein by reference.

Figure 2:
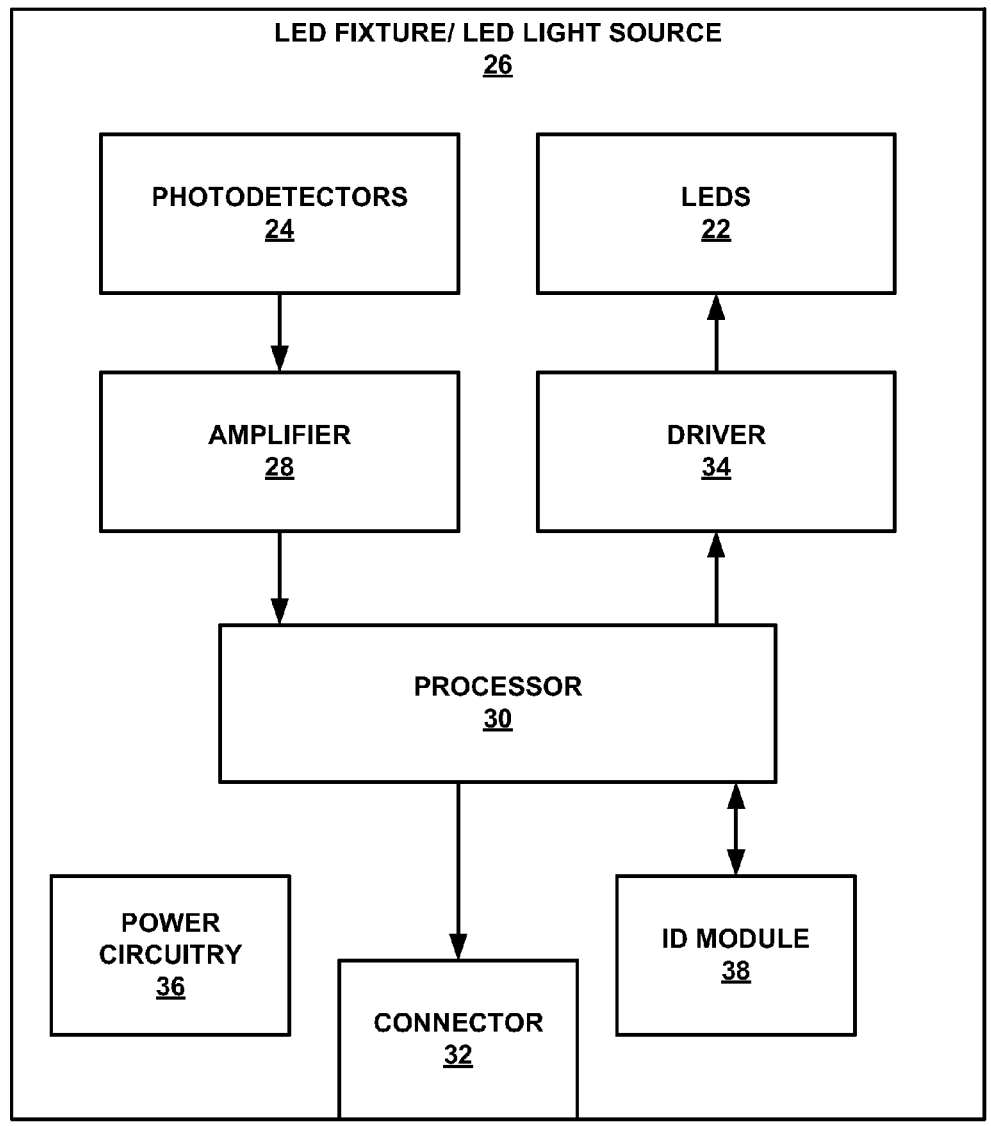
FIG. 2 is a block diagram illustrating an example LED light fixture that may be used with the techniques of this disclosure.

FIG. 2 is a block diagram illustrating an example LED light fixture that may be used with the techniques of this disclosure. LED light fixture 26 is configured to generate and receive pulsed light signals for pulsed light communication. Power and data applied to LED light fixture 26 is converted and transmitted as observable light, which includes pulsed light embedded communication/data signals that, in turn, are received by a transceiver (not shown) in communication with a computing device, for example. The transceiver receives and processes the pulsed light photons/lumens transmitted by LED light fixture 26, which includes embedded communication/data signals as carried by the observed light. The embedded communication signals within the observed light are not detectable by ordinary observation by an individual.

LED light fixture 26 of FIG. 2 includes, for example, photodetectors 24 for converting received light into an electrical signal, e.g., current, and amplifier circuitry 28 that amplifies the electrical signal. The received light may be received from a LED light dongle communication system connected to a client computer, for example, as described in U.S. Patent Application Publication No. 2008/0320200 to Pederson et al., the entire content of which is incorporated herein by reference.

Processor 30 receives a digitized version of the electric signal via an analog-to-digital converter (ADC)(not shown), generates data packets from the digitized signal, e.g., Ethernet data packets, encapsulates the data packets with appropriate header information and the like, and transmits the data packets to another computer device, e.g., laptop computer, desktop computer, and the like, via connector 32. LED fixture 26 may, for example, use broadband over power line (BPL) techniques to transmit the data packets, as described in U.S. Patent Application Publication No. 2009/0129782 to John C. Pederson, the entire content of which is incorporated herein by reference.

The term "processor" as used herein refers to a processor, controller, microprocessor, microcontroller, or any other device that can execute instructions, perform arithmetic and logic functions, access and write to memory, interface with peripheral devices, etc. Processor 30 may take the form of one or more microprocessors, controllers, ASICS, FPGAs, DSPs, or equivalent discrete or integrated logic circuitry. The functions attributed to processor 30 in this disclosure may be embodied as software, firmware, hardware or any combination thereof.

LED light fixture 26 of FIG. 2 further includes LEDs 22 and driver circuitry 34 for transmitting received data, e.g., Ethernet data packets, to client computer 16 of FIG. 1, for example, as light signals. Processor 30 receives data packets via connector 32, e.g., using BPL techniques, and decapsulates the data packets. Processor 30 controls a digital-to-analog converter (DAC)(not shown) and driver circuitry 34 to drive LEDs 22 with an analog signal that represents the received data, thereby generating light signals carrying embedded data.

LED light fixture 26 further includes power supply circuitry 36. As one example, LED light fixture 26 may receive AC line power, e.g., 120 V, and power supply circuitry 36 may include power converter circuitry to convert the line voltage to a direct current (DC) voltage that powers LED light fixture 26.

Figure 3:
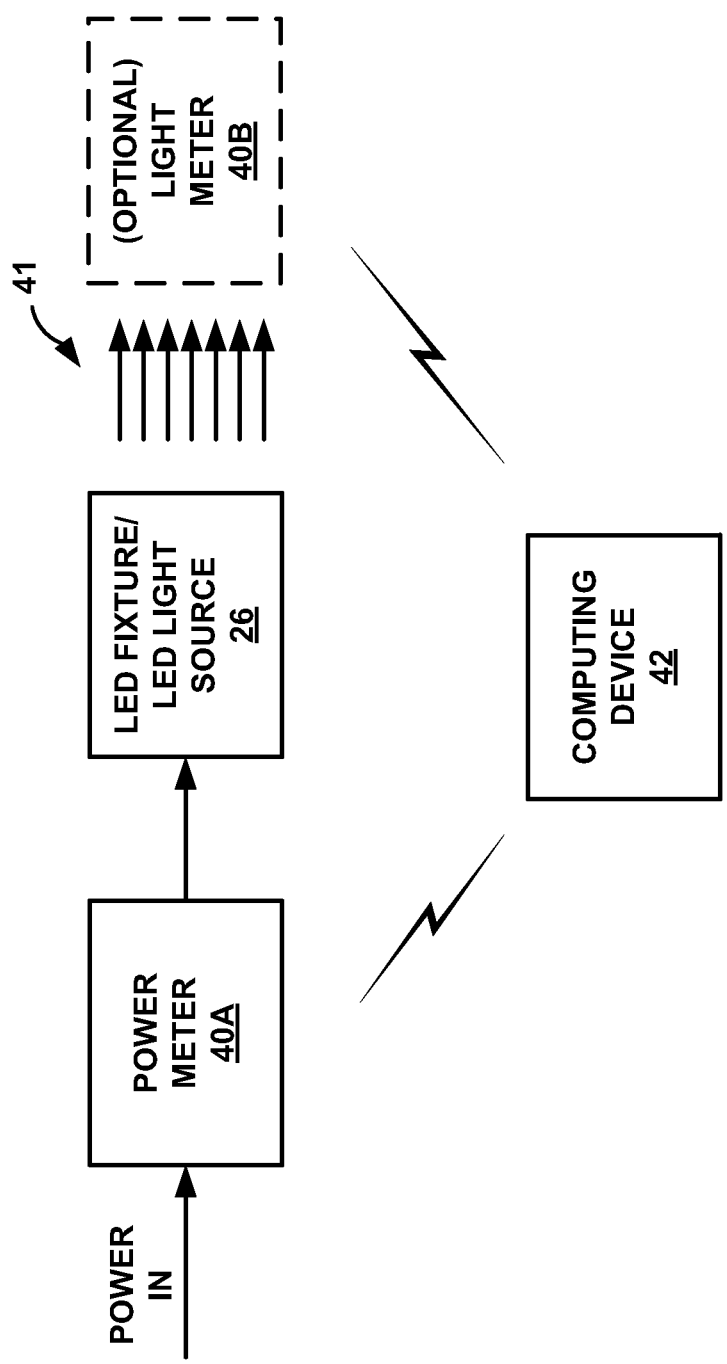
FIG. 3 is a block diagram illustrating an example metering configuration for an LED light fixture, in accordance with various technique of this disclosure.

In some examples, LED light fixture 26 further includes identification (ID) module 38. ID module 38 may include global positioning system (GPS) capabilities and/or an identification number, which processor 30 uses to generate a unique identifier for each LED light fixture to assist in the recording of data as measured by individual meters (FIG. 3). In some examples, each LED light fixture 26 may include a unique media access control (MAC) address that can serve as the fixture's unique identifier. In at least one example, LED light fixture 26 may transmit longitude, latitude, elevation and other GPS information, e.g., as a 20-digit number, either at regular or irregular intervals. In one example, the identification number associated with the LED light fixture may also emanate at regular or irregular intervals. ID module 38 provides each LED light fixture 26 with a unique identifier, which assists in the tracking and recording of usage data as measured by individual meters associated with each LED light fixture 26, as described in more detail below.

As described in more detail below, each LED light fixture is associated with a meter that measures an amount of electricity used by the LED light fixture. Processor 30 of LED light fixture 26, via ID module 38, generates a unique identifier using a unique identification number and/or GPS location, associates the measured amount of electricity with the unique identifier, and transmits a light signal comprising data representing the associated measured amount of electricity and unique identifier.

In one example, a customer using one or more LED light fixtures 26 has an account with an LED light fixture licensor (or simply "licensor"). Using the techniques of this disclosure, the amount of electricity used to generate photons by LED light fixture 26 can be tracked, quantified, and reported for billing purposes. The transmitted light signal comprising data representing the associated measured amount of electricity and unique identifier can be received, recorded, and assigned to a customer account for recording, processing, and summation, so that a billed expense may be issued by the licensor to the customer, as described in more detail below.

In one example, processor 30 may transmit data including a customer account number and/or customer location number specific to a property or address or floor in situations where the customer has more than one property, address locations, and/or floors. In some examples, in a manner similar to a premise having multiple phone lines, a customer location may have multiple identification numbers that are assigned to floors, or departments on a floor, where a main number is assigned as having a main account number for the customer.

It should be noted that LED light fixtures 26 may be mobile or stationary. Even if mobile, the unique identifier associated with each LED light fixture assists in the recording of data as measured by individual meters (FIG. 3).

The costs associated with the use of the LED light fixture and embedded communication/data transmission signals may be less than, and represent a cost savings, as compared to the utilization of traditional types of illumination sources. In at least one example configuration, the embedded communication data transmission signals incorporate security features that may operate in a manner similar to encryption to provide security for the embedded communication data transmission signals.

As described in more detail below, in accordance with various techniques of this disclosure, a provider of LED light fixtures 26 can track and/or quantitatively measure the photons generated by LED light fixtures 26 that provider 44 supplied to a customer. In addition, and in accordance with various techniques of disclosure, the provider has inserted itself between the customer and power company, thereby allowing the provider to generate a revenue stream for the provider based on the tracked and/or quantitatively measured photon generation.

Additional information and details regarding LED light communication systems can be found in the following references, the entire contents of each being expressly incorporated herein by reference: U.S. Patent Application Publication No. 2008/0310850; U.S. Patent Application Publication No. 2008/0320200; U.S. Patent Application Publication No. 2009/0129782; U.S. Patent Application Publication No. 2008/0317475; U.S. Patent Application Publication No. 2009/0003832; and U.S. Patent Application Publication No. 2008/0292320.

It should be noted that although various techniques of this disclosure are described with respect to LED light fixture 26, the disclosure is not limited to fixtures. Rather, various techniques of this disclosure may be used in conjunction with any LED light source, e.g., LED lamp and the like. For example, an LED light source, e.g., LED lamp, may include one or more components described above with respect to LED light fixture 26.

FIG. 3 is a block diagram illustrating an example metering configuration for an LED light fixture, in accordance with various techniques of this disclosure. As seen in the example configuration depicted in FIG. 3, both the line-in side (from the electricity supplier, e.g., power company) and line-out side of LED light fixture 26 may include a meter. In particular, FIG. 3 depicts meter 40A receiving power (e.g., AC line power from a power company, or DC power). Meter 40A measures the amount of current drawn by LED light fixture 26 and the voltage at which the current is drawn. Hence, meter 40A may be considered a power meter, or may be considered to perform a power metering function. Meter 40A transmits the measured current and voltage to LED fixture 26 and, in particular, processor 30 of LED fixture 26 as power consumption data. Processor 30 of fixture 26 then associates the received power consumption data with the unique identifier of fixture 26 and either stores the data in memory, e.g., FLASH RAM or the like (not depicted), or transmits the associated data, as described above. In this manner, the amount of electricity used by LED light fixture 26 to generate photons and/or visible light can be tracked, quantified, and reported for billing purposes. Meter 40A provides a "submetering" function that allows the electrical consumption of each LED light fixture 26 to be determined.

The measurement of the visible light and/or photons may be in any quantitative measurement per given period of time as opposed to hour increments. The measurement of the photons generated may be referred to photons per hour or photons per some other period of time.

In some configurations, meter 40B is provided. Optional meter 40B measures the luminosity (or quality of the luminosity) of LED light fixture 26, by measuring the amount of lumens produced by LED light fixture 26. In particular, meter 40B receives light emitted from the LEDs of fixture 26, shown generally at 41 in FIG. 3, meter 40B determines the luminosity of light 41 emitted from the LEDs of fixture 26 (and, in some examples, the color of light 41 for color correction purposes), and meter 40B transmits the determined luminosity to LED fixture 26, and, in particular, processor 30 of LED fixture 26 or to computing device 42 (which will transmit the determined luminosity to LED fixture 26). Upon receiving the determined luminosity from meter 40B, processor 30 of LED light fixture 26 retrieves from a memory device in fixture 26 (not depicted) a luminosity value, e.g., preconfigured value stored in the memory device, and compares the luminosity value measured by meter 40B to the value retrieved from memory. Meter 40B may be considered a light (or lumen) meter, or may be considered to perform a light (or lumen) metering function.

If processor 30 determines that the luminosity value as measured by meter 40B is less than the value retrieved from the memory device, processor 30 controls driver circuitry 34 of fixture 26 to increase the amount of current applied to LEDs 22, thereby increasing the amount of light output from LEDs 22 which, in turn, increases the luminosity of LED light fixture 26. For instance, an agreement between the LED light fixture customer and the LED light fixture provider, e.g., agreement 72A of FIG. 6, may include a provision that the provider, e.g., provider 44 of FIG. 6, agrees to provide an amount of lumens or luminosity to the customer, e.g., customer 46A of FIG. 6, for an agreed upon price over an agreed upon time period. As LEDs 22 of fixture 26 degrade over time from use and produce less light (in response to a particular applied current level), processor 30 of fixture 26 controls driver circuitry 34 to increase the amount of current applied to LEDs 22 in order to provide the agreed upon amount of lumens or luminosity. In this manner, meter 40B aids in calibrating LED light fixture 26 so that the fixture is in compliance with the agreement between the customer and the provider.

Of course, as more current is applied to LEDs 22, meter 40A measures an increase in power consumption by fixture 26. As fixture 26 ages and requires more power to produce a given lumen output, the profit to the provider is reduced because the amount of money that the customer pays the provider for a given lumen output is independent of how much electricity is required to produce that given output. The electrical cost paid by the provider to the electricity supplier and the provided lumen output are predetermined.

In one example, processor 30 of LED light fixture 26 controls driver circuitry to increase the amount of current applied to LEDs 22 based on values stored in a memory device in LED light fixture 26. For example, a data structure, e.g., table, stored in the memory device may associate a set of luminosity values with a set of current values to be applied to LEDs. Processor 30 accesses the data structure, compares the measured luminosity value from meter 40B with the stored set of luminosity values, and retrieves a current value associated with that luminosity value (or a value close to it) from the stored set of current values. Then, processor 30 controls driver circuitry 34 to apply the retrieved current value to LEDs 22.

In some examples, a master computer, e.g., computing device 42, may query one or more of LED light fixtures 26 in order to retrieve the stored luminosity information and/or power consumption information. If appropriate, the master computer controls processor 30 of LED light fixture 26 to adjust its light output.

In some configurations, only the line-in side meter 40A is used. It should be noted that in some example configurations, meters 40A, 40B are integral with LED light fixture 26 such that meters 40A, meter 40B (if present), and LED light fixture form a single unit. In one example configuration, meters 40A, 40B are separate components that are external to and in communication with LED light fixture 26. In some examples, the LED light fixture provider (provider 44 of FIG. 4) maintains the line-in side meter 40A.

The power entering LED light fixture 26 is converted by LED light fixture 26 into observable light, which includes pulsed light embedded communication/data signals. The light, in turn, is received by another transceiver that processes the pulsed light photons/lumens to process and communicate the embedded communication/data signals as carried by the observed light. The embedded communication signals within the observed light are not detectable by ordinary observation by an individual.

FIG. 3 further depicts computing device 42. Computing device 42 is any device capable of communicating with meters 40 and storing and processing data related to the amount of electricity used by LED light fixture 26 to generate photons and/or visible light. Accordingly, computing device 42 includes, for example, one or more processors, memory for storing instructions executable by the one or more processors as well as data, and communication functionality. In one example, computing device 42 may be remotely located at the LED light fixture provider's premises and owned and operated by the provider. In another example, computing device 42 may be positioned on the customer's site and either owned and operator by the provider or owned and operated by the customer.

In at least one example configuration, an LED light fixture customer has an account with the LED light fixture provider. For each LED light fixture 26, processor 30 transmits data packets comprising the electricity usage measured by meter 40A (and if present, the lumens measured by meter 40B), and the unique identifier for the LED light fixture. Processor 30 may execute instructions, without user intervention, that cause processor 30 to periodically transmit the data packets comprising the electricity usage measured by meter 40A (and if present, the lumens measured by meter 40B) and the unique identifier for the LED light fixture, e.g., daily, weekly, biweekly. Or, in some examples, processor 30 may execute instructions, without user intervention, that cause processor 30 to almost continuously transmit the data packets comprising the electricity usage measured by meter 40A (and if present, the lumens measured by meter 40B) and the unique identifier for the LED light fixture, e.g., once per minute, every other minute, every five minutes, or some other small time interval. In other examples, processor 30 may respond to a user request, e.g., via computing device 42, and execute instructions that cause processor 30 to transmit the data packets comprising the electricity usage measured by meter 40A (and if present, the lumens measured by meter 40B) and the unique identifier for the LED light fixture.

The meter is assigned to a customer account for recording, processing, and summation, so that a billed expense may be issued by the provider to the customer. In one example, the provider may estimate the amount of electricity that will be used by the LED light fixtures on the customer's premises, e.g., in the first year after installation of the LED fixtures.

Regardless of whether meters 40A, 40B are integral with LED light fixture, the functions attributed to meters 40A, 40B in this disclosure may be embodied as software, firmware, hardware or any combination thereof.

Figure 4:
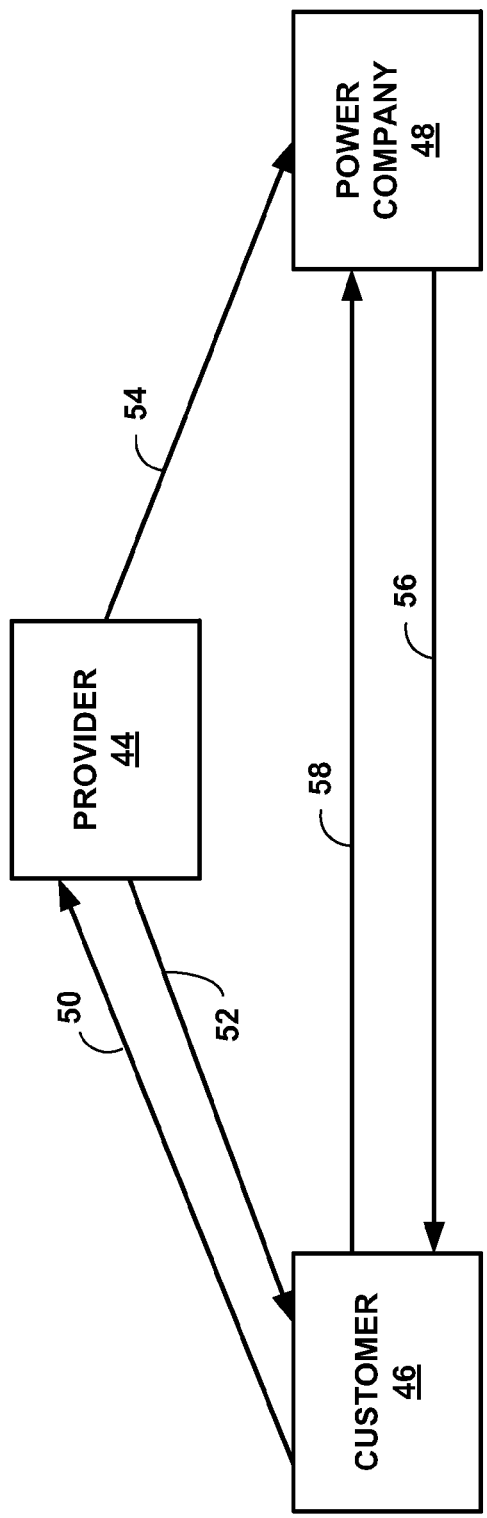
FIG. 4 is a block diagram illustrating an example LED light fixture agreement between a customer and a licensor.

FIG. 4 is a block diagram illustrating an example LED light fixture agreement between a customer and a licensor, in accordance with this disclosure. FIG. 4 depicts three entities, namely LED light fixture provider 44, LED light fixture customer 46, and power company 48 (also referred to as an "electricity supplier"). LED light fixture customer 46 is an entity that uses one or more LED light fixtures 26 supplied by LED light fixture provider 44. In accordance with a contractual agreement between provider 44 and customer 46, customer 46 agrees to pay provider 44 a pre-determined monetary amount for each LED light fixture 26 supplied to customer 46 by provider 44, as indicated by line 50, as compensation for the photons generated by the LED light fixtures. Within the photons received by the customer is embedded pulse light communication and/or data. In return, provider 44 agrees to provide customer 46 with LED light fixtures that can provide illumination, embed receivable data within the illumination, and receive data embedded within transmitted light signals, as indicated by line 52.

Additionally, as part of the contractual agreement between provider 44 and customer 46, provider 44 agrees to pay the electricity supplier, e.g., power company 48, on behalf of customer 46, a monetary amount for the cost of the electricity used to generate the photons by each LED light fixture 26 on the customer's premises. The payment made by the provider to the electricity supplier is used as a credit against any account balance owed by the customer to the electricity supplier. To facilitate this payment, the customer may provide the LED light fixture provider with the name of the customer's electricity supplier, e.g., the local power company, and the customer's account information with the electricity supplier.

As described above, meter 40A (FIG. 3) is used to determine the amount of electricity used to generate the photons by each LED light fixture 26. During each power company billing period, for example, provider 44 pays power company 48 (into an account associated with customer 46) a monetary sum equal to the total cost of the electricity used to generate the photons for all LED light fixtures 26 on the customer's premises, as indicated by line 54. The difference between what customer 46 agreed to pay provider 44 as a pre-determined monetary amount for each LED light fixture 26 supplied to customer 46 by provider 44 (line 50) and what provider 44 pays power company 48 as a monetary sum equal to the total cost of the electricity used to generate the photons for all LED light fixture 26 on the customer's premises (line 54) is realized as a profit for provider 44.

By way of specific example, assume that customer 46 enters a contractual agreement with provider 44 and has two LED light fixtures on the customer's premises. In the agreement, customer 46 agreed to pay provider 44 $2.50 per fixture, per 30 day billing period, in perpetuity as compensation for the photons generated by the LED light fixtures. During a power company 48 billing cycle, e.g., 30 days, provider 44 determined, via one or more meters 40A, that the two LED fixtures on the customer's premises consumed electricity totaling $2.25 per fixture. Per their agreement, provider 44 deposits, transfers, or otherwise establishes a credit with the customer's account at power company 48 in the amount of $4.50 ($2.25 * 2 LED light fixtures). Because provider 44 received from customer 46 $5.00 ($2.50 * 2 LED light fixtures) as compensation for the photons generated by the LED light fixtures per 30 day billing period, provider 44 realizes a profit of $0.50 for that particular billing cycle. In this manner, using the techniques of this disclosure, provider 44 can track the photons generated by the LED light fixtures that provider 44 has supplied to customer 46. In addition, and in accordance with various techniques of disclosure, provider 44 has inserted itself between customer 46 and power company 48, thereby allowing provider 44 to generate a revenue stream for provider 44 based on the tracked photon generation.

Still referring to FIG. 4, customer 46 and power company 48 have a contractual agreement in which customer 46 is financially obligated to pay power company 48 for the expense of power consumed by customer 46 that is in excess of the amount credited by provider 44 to the customer's account with power company 48. The excess power expense may be incurred by the customer by use of electrical devices that are not associated with LED light fixtures that include embedded communication and/or data, e.g., traditional light sources other than the LED light fixtures or electricity used by other electrical devices. In accordance with their agreement, power company 48 agrees to supply customer 46 with electricity (indicated by line 56) and customer 46 agrees to pay power company 48 a monetary amount for the electricity consumed (indicated by line 58). As described above, provider 44 pays power company 48 a monetary sum equal to the total cost of the electricity used to generate the photons or all LED light fixtures 26 on the customer's premises (line 54). Customer 46, however, has likely consumed electricity beyond that used to generate photons for all LED light fixtures 26 on the customer's premises. Hence, customer 46 owes power company 48 a monetary sum equal to the difference between the credits applied to the customer's account by provider 44 and the excess consumed electricity. Power company 48 bills customer 46 for the difference.

Figure 5:
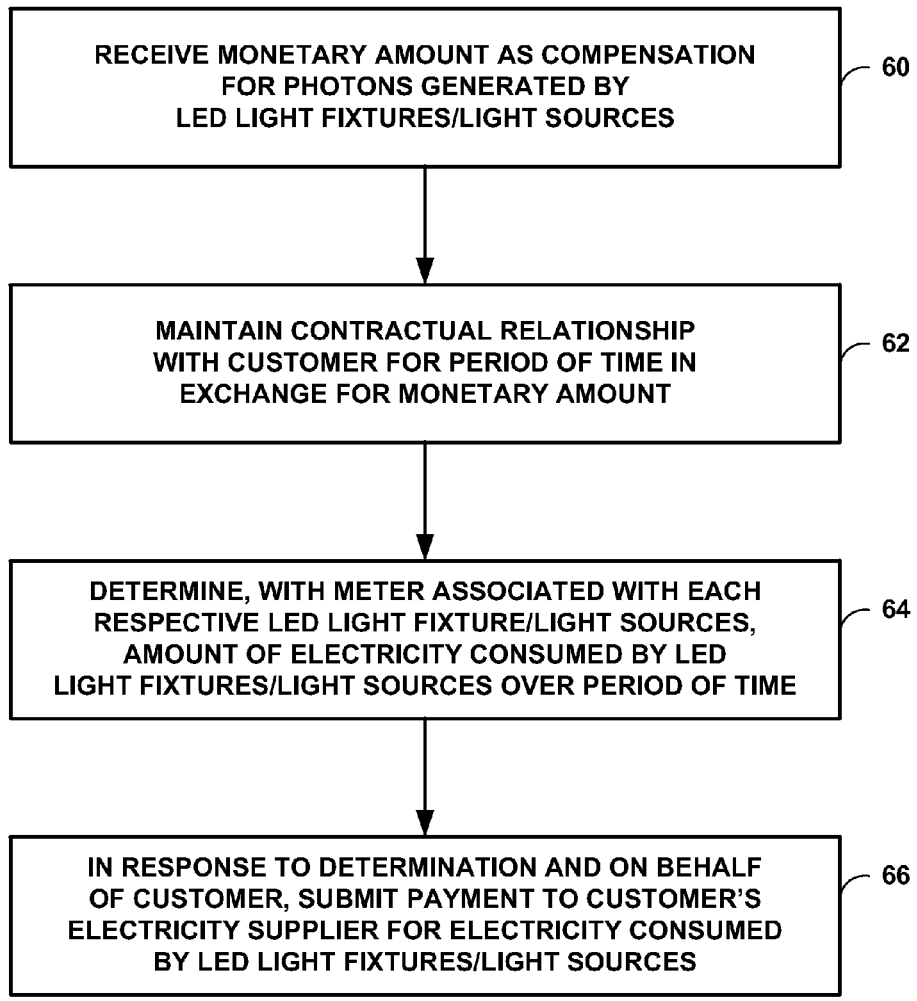
FIG. 5 is a flow chart illustrating an example method of compensating an LED light fixture provider for generation of photons by one or more LED light fixtures used by a customer.

FIG. 5 is a flow chart illustrating an example method of compensating an LED light fixture provider for generation of photons by one or more LED light fixtures used by a customer. In the example method of FIG. 5, an LED light fixture provider, e.g., provider 44, receives from an LED light fixture customer, e.g., customer 46, a pre-determined monetary amount as compensation for photons generated by LED light fixtures 26 installed at the customer's premises (60). Provider 44 may receive the pre-determined monetary amount on a periodic basis, e.g., weekly, monthly, or yearly. In other words, provider 44 may receive a payment from the customer at a regular interval corresponding to a period of time, as agreed upon by provider 44 and customer 46. For example, assume that customer 46 enters a contractual agreement with provider 44 and has two LED light fixtures on the customer's premises. In the agreement, customer 46 agreed to pay provider 44 $2.50 per fixture in perpetuity as compensation for the photons generated by the LED light fixtures.

Per a previously entered into contractual agreement, provider 44 maintains a contractual relationship with customer 46 for a period of time in exchange for the pre-determined monetary amount, the contractual relationship including a requirement that provider 44 pay the customer's electricity supplier, e.g., power company 48, for the electricity consumed by the LED light fixtures (62) used by the customer. The method of FIG. 5 further includes determining, with a meter associated with each respective LED light fixture, e.g., meter 40A, the amount of electricity consumed by the LED light fixtures used by the customer over a period of time (64). Then, in response to the determination and on behalf of customer 46, provider 44 submits payment to the customer's electricity supplier, e.g., power company 48, for the electricity consumed by the LED light fixtures 26 (66) used by the customer.

For example, during a power company 48 billing cycle, e.g., 30 days, provider 44 determined, via meters 40A, that the two LED fixtures on the customer's premises consumed electricity totaling $2.25 per fixture. Per their agreement, provider 44 deposits, transfers, or otherwise establishes a credit with the customer's account at power company 48 in the amount of $4.50 ($2.25 * 2 LED light fixtures). Because provider 44 received from customer 46 $5.00 ($2.50 * 2 LED light fixtures) as compensation for the photons generated by the LED light fixtures, provider 44 realizes a profit of $0.50 for that particular billing cycle. In this manner, using the techniques of this disclosure, provider 44 has inserted itself between customer 46 and power company 48 in order to generate a revenue stream.

Figure 6:
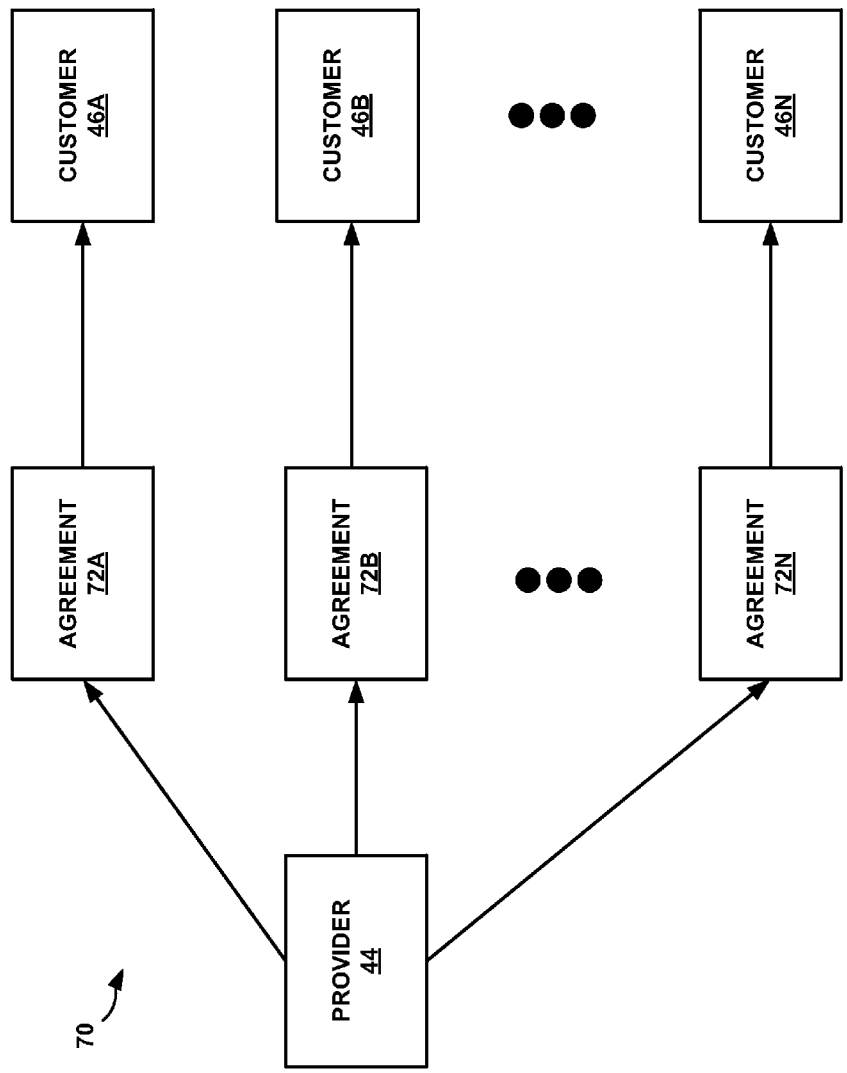
FIG. 6 is a block diagram of an example system for compensating an LED light fixture provider for generation of photons by one or more LED light fixtures used by a customer.

FIG. 6 is a block diagram of an example system for compensating an LED light fixture provider for generation of photons by LED light fixtures used by a customer. The system, shown generally at 70, includes LED light fixture provider 44 establishing and maintaining a contractual agreement, e.g., agreement 72A, with an LED light fixture customer, e.g., customer 46A. Provider 44 may establish and maintain additional contractual agreements, e.g., agreements 72B-72N (each agreement referred to generally in this disclosure as "agreement 72") with additional customers 46B-46N, respectively, (each customer referred to generally in this disclosure as "customer 46").

LED light fixture provider 44 may be a LED light fixture manufacturer, LED light fixture retailer, or LED light fixture distributor, or any other party capable of providing LED light fixtures. Customer 46 is any person, organization (public or private), or other entity capable of receiving, maintaining, and operating an LED light fixture, e.g., LED light fixture 26. Examples of customers include, but are not limited to, government entities (e.g., city governments), school districts, shopping malls, private businesses, individuals, airports, and the like.

Agreements 72 include any legally binding instrument, electronic or tangible, capable of establishing a contractual relationship between a customer, e.g., customer 46A, and a provider, e.g., provider 44, ("the parties"). Agreements 72 set forth the terms and conditions of the contractual relationship between the parties. In one example, agreements 72 are tangible agreements that may be signed by the parties. In other examples, agreements 72 are "click-thru" agreements in which the customer, e.g., customer 46A, manifests assent by clicking an "ok" or "agree" button or the like on a dialog box or pop-up window.

Per each agreement 72, the customer, e.g., customer 46A, agrees to pay LED light fixture provider 44, a pre-determined monetary amount as compensation for photons generated by LED light fixtures 26 installed at customer 46A's premises. In exchange for the pre-determined monetary amount, provider 44 agrees to pay the customer's electricity supplier, e.g., power company 48, for the electricity consumed by the LED light fixtures used by the customer. Because provider 44 will generally receive from the customer, e.g., customer 46A, a compensatory amount greater than the cost of the electricity usage, provider 44 realizes a profit and generates a revenue stream.

In some examples, the agreement between the parties includes three or more phases, e.g., stages. In other examples, the agreement between the parties includes less than three phases.

In one example, the use of LED light fixtures having embedded communication/data signal transmissions capabilities is an infrastructure change to the customer. In some examples, in at least one phase the agreement requires the customer to pay to the provider an agreed-upon price for manufacture and installation of each LED light fixture. The provider retains ownership of the LED light fixture in some examples. In at least one example, the customer may also lease from the LED light fixture provider one or more USB Internet transceivers for an agreed-upon price.

In at least one example, payment of the agreed-upon installation price and execution of the agreement, e.g., agreement 72A, places the customer, e.g., customer 46A, in a priority position relative to other customers which enter into the contract with provider 44 at a later date. In one example, early entry into an agreement with provider 44 affords priority to the customer with respect to installation or service of LED light fixtures at additional locations (to be identified at a future date) or when the customer adds additional designated locations or fixtures within a particular property. That is, the customer's execution of the agreement places the customer in an established position in a queue with respect to installation and/or service of additional LED light fixtures at the customer's facility. The faster that the customer establishes its priority in the queue, then the faster the customer will start saving energy and receiving embedded communication/data services.

In one example, the agreement with the customer will include a charge and an agreement that the customer pays for the equipment necessary in phase 1 of the contract. Phase 2 of the agreement may, in some examples, have another equipment charge for additional LED light fixtures and the installation of additional LED light fixtures. In some examples, the equipment charge and/or the installation charge per light fixture in phase 2 is lower than in phase 1, due to economies of scale.

Customers may save costs by using LED light fixtures, which eliminate the expenses associated with conventional light sources, the replacement costs associated with conventional light sources, the labor costs associated with the replacement of conventional light sources, the labor costs associated with bookkeeping, tracking, and payments associated with conventional light sources, the expense of purchasing lights, receiving lights, unpacking lights, distributing lights, installing lights, removing and disposing of exhausted lights, breakage of purchased lights, storage of purchased lights, retrieval of lights, replacing ballasts and sockets and the accounting associated with the above tasks.

In addition, the cost may vary between locations and/or facilities for a customer. It should be noted that the expenses as identified above are representative of examples, and by no means are exhaustive of all of the direct and/or indirect expenses associated with a conventional light source. Using LED light fixtures 26 may eliminate a number of the above identified expenses for the customer.

In one example, provider 44 is responsible for the ongoing expense associated with the replacement of an LED light fixture. In other examples, customer 46 may be responsible for the agreed-upon expense associated with the manufacturer, installation, and/or replacement of an LED light fixture.

In some examples, provider 44 assists customer 46 in identifying the costs associated with conventional illumination sources so that an actual cost savings may be identified and communicated to individuals having decision authority to minimize waste of resources by the customer. In at least one embodiment, the use of LED light fixtures including embedded communication/data, conserves and saves natural resources reducing the stress on the environment.

In one example, the parties agree on a value and/or expense associated with the use of the conventional light sources so that expense savings resulting from the use of the LED light fixtures may be identified and realized. Provider 44 may, in some examples, determine or assist in the determination of an average expense incurred by a customer that uses conventional light sources.

The typical light bulb (or other conventional illumination source) following installation generally produces less light as the bulb ages even though the bulb consumes the same amount of power over time. A reduction in the produced illumination of a conventional light source may be due to dirt, deposits on the outside or inside of the gas, gas leakage, and/or wear in the filament. In one example, provider 44 assists customer 46 in identifying and quantifying intangible expenses associated with a conventional light source such as reduced productivity, downtime, discussions and communications related to service and maintenance, as well as/or loss of productivity due to frustration. In at least one example, provider 44 prepares a chart of the usual expenses and cost savings associated with the use of LED light fixtures as compared to conventional light sources.

In one example implementation, the cost savings realized by the customer equals the difference in the calculated and agreed upon composite costs associated with the use of traditional light sources following consideration of the factors identified above, less the amount that has been agreed to be paid to the provider for the use of the LED light fixtures having embedded communication/data transmission. The customer may, for example, finance the installation and manufacture costs associated with the LED light fixtures having embedded communication/data transmission by continuing to pay to the provider the entire amount as agreed upon by the customer and/or provider of the actual previous cost expense incurred by the customer for the use of conventional light sources, following the consideration of the above identified factors.

In at least one example, the customer may finance the initial installation and manufacturing expenses for one or more LED light fixtures in a manner similar to a performance contract. Factors considered by the customer are present capital expenditure outlay and incurred immediate operational savings versus continuous payment of a previous level of expenditure and realization of operational savings at a future date once financing is liquidated/exhausted. In at least one example, the initial capital investment is available where ongoing operational expenses are problematic, where the ongoing cost savings associated with the use of the LED light fixtures with embedded communication/data transmission enables the customer to afford to proceed with the use of LED light fixtures as an ongoing operational expense.

In at least one embodiment, pursuant to the contractual agreement, the customer 46 will agree to compensate provider 44 an agreed upon fixed sum, in addition to the metered electricity consumed by the LED light fixtures/LED light sources (62) used by the customer 46, for each agreed upon period of time. In at least one embodiment, pursuant to the contractual agreement, the customer 46 will agree to compensate provider 44 an agreed upon multiplier of the metered electricity consumed by the LED light fixtures/LED light sources (62) used by the customer 46, for each agreed upon period of time. It should be noted that any other method or type of compensation enhancement from the customer 46 to the provider 44 above the metered electricity consumed by the LED light fixtures/LED light sources (62) used by the customer 46, is contemplated under this invention. It is anticipated that the contractual relationship will include a requirement that provider 44 pay the customer's electricity supplier, e.g., power company 48, for the electricity consumed by the LED light fixtures/LED light sources (62) used by the customer.

Various aspects of the disclosure have been described. These and other aspects are within the scope of the following claims.

The invention claimed is:

1. A method of tracking lumen generation and payment for lumen generation from at least one light emitting diode light fixture used by a customer, the method comprising:
    providing at least one light emitting diode light fixture, the provider of the at least one light emitting diode light fixture receiving payment of a pre-determined monetary amount as compensation for photons generated by the at least one light emitting diode light fixture for a period of time;
    metering the electricity entering the at least one light emitting diode light fixture over the period of time and storing the metered amount of electricity entering the at least one light emitting diode light fixture over the period of time in memory on at least one processor;
    measuring the light exiting the at least one light emitting diode light fixture over the period of time and storing in said memory the measured light exiting the at least one light emitting diode light fixture over the period of time on the at least one processor;
    automatically comparing at the at least one processor the measured amount of light at each of the at least one light emitting diode light fixture for the period of time to data representative of a desired lumen illumination level wherein the at least one processor automatically adjusts the electricity to be provided to each of the at least one light emitting diode light fixture to achieve the desired lumen illumination level;
    storing in said memory the adjusted electricity provided to each of the at least one light emitting diode light fixture for the period of time;
    retrieving from memory and compiling on a computing device the metered electricity and the adjusted electricity provided to each of the at least one light emitting diode light fixture for the period of time;
    determining at the computing device the amount of compensation to be paid to the customer's supplier of electricity for the compiled electricity at least one light emitting diode light fixture for the period of time; and
    submitting payment from the provider of the at least one light fixture to the customer's electricity supplier for the electricity entering the at least one light emitting diode light fixture for the period of time.

2. The method of claim 1, further comprising communicating the metered amount of electricity to a computing device on a weekly basis.

3. The method claim 1, further comprising communicating the metered amount of electricity to the computing device, the communication comprising a unique identifier associated with the at least one light emitting diode light fixture.

4. The method of claim 3, wherein the unique identifier comprises global positioning system information.

5. The method of claim 1, further comprising communicating the metered amount of electricity to the computing device without user intervention.

6. The method of claim 1, further comprising communicating the metered amount of electricity to the computing device upon a user or provider request.

7. The method of claim 1, further comprising:
    Identifying the total amount of electricity associated with each respective light emitting diode light fixture, and the amount of lumens generated by the at least one light emitting diode light fixture over a period of time.

8. The method of claim 7, further comprising:
    increasing an amount of current applied to at least one light emitting diode of the light emitting diode light fixture if the amount of lumen generated by the at least one light emitting diode light fixture is determined to be below a pre-determined level.

9. A method for tracking lumen illumination and payment for lumen illumination, said method comprising:
    authorizing a provider of at least one light emitting diode light fixture to submit payment to a preexisting customer electrical account with an electricity provider for electricity used in generating lumen illumination over a billing cycle;
    installing at least one light emitting diode light fixture at a customer location;
    the at least one light emitting diode light fixture provider receiving payment of a pre-determined monetary amount as compensation for photons generated by each of the at least one light emitting diode light fixture for said billing cycle;
    metering electricity provided to each of the at least one light emitting diode light fixture for a period of time and storing the metered electricity provided to each of the at least one light emitting diode light fixture on at least one processor having memory;
    measuring the amount of lumens generated by each of the at least one light emitting diode light fixture for the period of time and storing the measured amount of lumens within said at least one processor having memory;
    automatically comparing the measured amount of lumens at each of the at least one light emitting diode light fixture for the period of time to data representative of a desired lumen illumination level as stored in the memory of the at least one processor;
    automatically adjusting the electricity to be provided to each of the at least one light emitting diode light fixture to achieve a desired lumen illumination level said adjusting being implemented by said at least one processor;
    calculating within a computing device an electrical payment to be made by the provider of the at least one light emitting diode light fixture to the preexisting customer electrical account with the electricity provider; and
    making a payment from the provider of at least one light emitting diode light fixture to the preexisting customer electrical account with the electricity provider for the billing cycle.

10. The method of claim 9, further comprising storing on said at least one processor having memory the adjusted amount of electricity provided to each of the at least one light emitting diode light fixture for the period of time to achieve the desired lumen illumination level prior to said calculating of said electrical payment.

11. The method of claim 10, further comprising retrieving the metered electricity and the adjusted electricity provided to each of the at least one light emitting diode light fixture from the memory of the at least one processor according to a communication schedule.

12. The method of claim 9, each light emitting diode light fixture comprising a unique identifier.

13. The method of claim 9, wherein said period of time is a week.

14. The method of claim 9, wherein said period of time is a day.

15. The method of claim 12, wherein the unique identifier comprises global positioning system information.

16. The method of claim 9, further comprising retrieving the metered electricity and the adjusted electricity provided to each of the at least one light emitting diode light fixture without user intervention.

17. The method of claim 9, further comprising retrieving the metered electricity and the adjusted electricity provided to each of the at least one light emitting diode light fixture upon a user or provider request.

* * * * *